US010394183B2

(12) United States Patent
Ao

(10) Patent No.: US 10,394,183 B2
(45) Date of Patent: Aug. 27, 2019

(54) LINK MECHANISM AND IMAGE FORMING APPARATUS

(71) Applicant: FUJI XEROX CO.,LTD., Tokyo (JP)

(72) Inventor: Satoshi Ao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/105,989

(22) Filed: Aug. 21, 2018

(65) Prior Publication Data

US 2019/0146407 A1 May 16, 2019

(30) Foreign Application Priority Data

Nov. 10, 2017 (JP) ................................ 2017-217691

(51) Int. Cl.
*G03G 21/16* (2006.01)
*F16H 21/44* (2006.01)

(52) U.S. Cl.
CPC ......... *G03G 21/1647* (2013.01); *F16H 21/44* (2013.01)

(58) Field of Classification Search
CPC ............................ G03G 21/1647; F16H 21/44
See application file for complete search history.

(56) References Cited

U.S. PATENT DOCUMENTS 4,132,476 A * 1/1979 Wetzel ............... G03G 15/0896 399/119
8,078,085 B2 12/2011 Okabe
8,331,825 B2 12/2012 Itabashi
8,452,213 B2 5/2013 Okabe
8,794,706 B2 * 8/2014 Lin ........................ A47C 7/506 297/423.28
9,008,547 B2 4/2015 Takano
2013/0308983 A1 * 11/2013 Takano ................ G03G 15/757 399/205
2018/0022561 A1 * 1/2018 Hama ................ G03G 15/6552 271/128

FOREIGN PATENT DOCUMENTS

| | | |
|---|---|---|
| JP | 2009134004 | 6/2009 |
| JP | 2009175416 | 8/2009 |
| JP | 2014002350 | 1/2014 |

* cited by examiner

*Primary Examiner* — Francis C Gray
(74) *Attorney, Agent, or Firm* — JCIPRNET

(57) ABSTRACT

A link mechanism includes a rotatable link having a fulcrum pin on which the rotatable link rotates, and a connecting pin provided at a different position from the fulcrum pin; and a supporting member having a guiding groove along which the connecting pin of the rotatable link that is moved between two positions is guided, and a supporting groove in which the fulcrum pin of the rotatable link is rotatably supported. The guiding groove of the supporting member includes a long-side guiding portion shaped with a curvature that is greater than a curvature of a substantially arc shape defined by a radius corresponding to a distance between the fulcrum pin and the connecting pin of the rotatable link. The supporting groove of the supporting member is a substantially oblong groove extending in a direction intersecting a direction in which the long-side guiding portion of the guiding groove extends.

13 Claims, 18 Drawing Sheets

LINK MECHANISM AND IMAGE FORMING APPARATUS

CROSS-REFERENCE TO RELATED APPLICATIONS

This application is based on and claims priority under 35 USC 119 from Japanese Patent Application No. 2017-217691 filed Nov. 10, 2017.

BACKGROUND

Technical Field

The present invention relates to a link mechanism and an image forming apparatus.

SUMMARY

According to an aspect of the invention, there is provided a link mechanism including a rotatable link having a fulcrum pin on which the rotatable link rotates, and a connecting pin provided at a different position from the fulcrum pin; and a supporting member having a guiding groove along which the connecting pin of the rotatable link that is moved between two positions is guided, and a supporting groove in which the fulcrum pin of the rotatable link is rotatably supported. The guiding groove of the supporting member includes a long-side guiding portion shaped with a curvature that is greater than a curvature of a substantially arc shape defined by a radius corresponding to a distance between the fulcrum pin and the connecting pin of the rotatable link. The supporting groove of the supporting member is a substantially oblong groove extending in a direction intersecting a direction in which the long-side guiding portion of the guiding groove extends.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
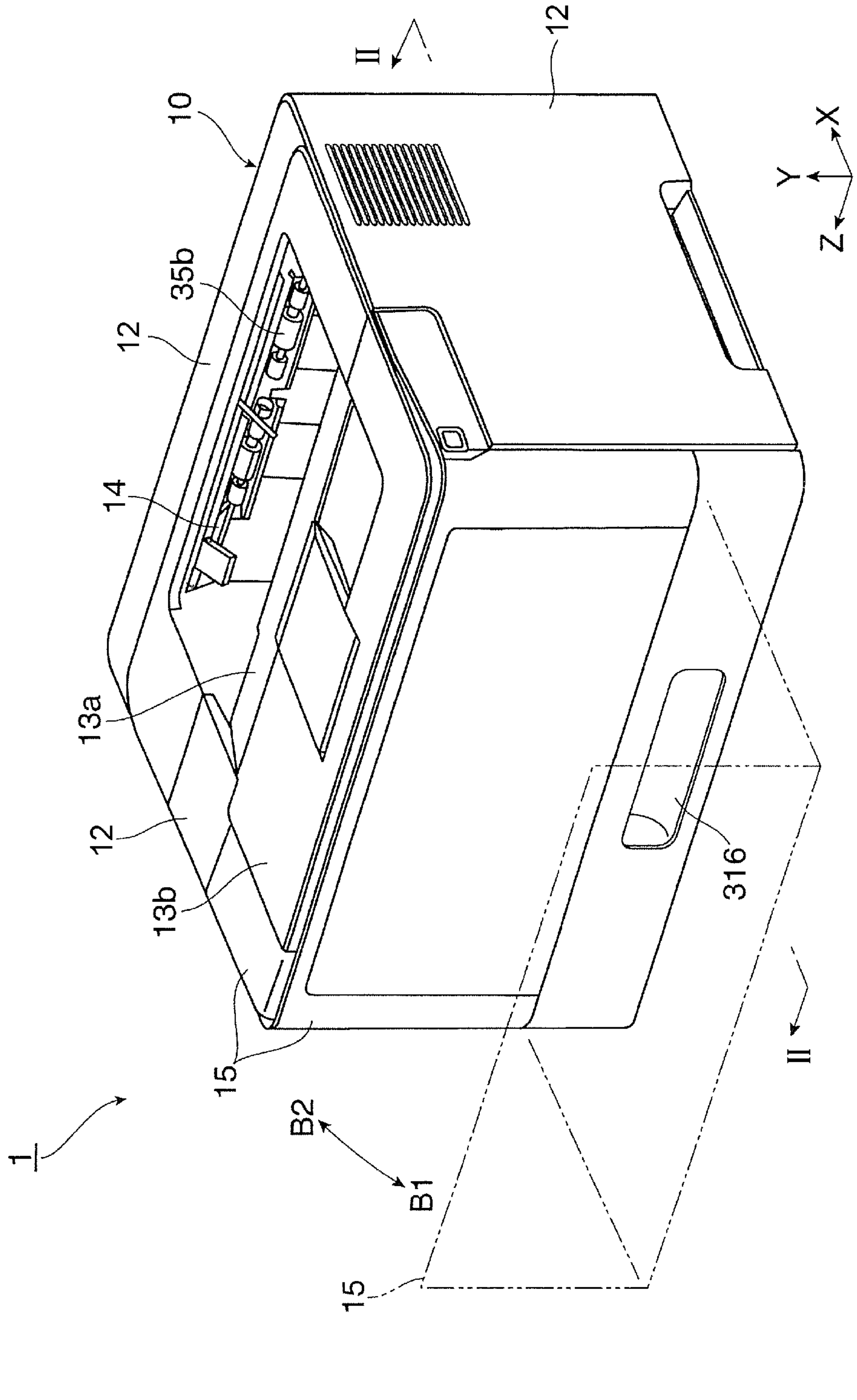
FIG. 1 is a schematic external perspective view of an image forming apparatus according to a first exemplary embodiment.
Figure 2:
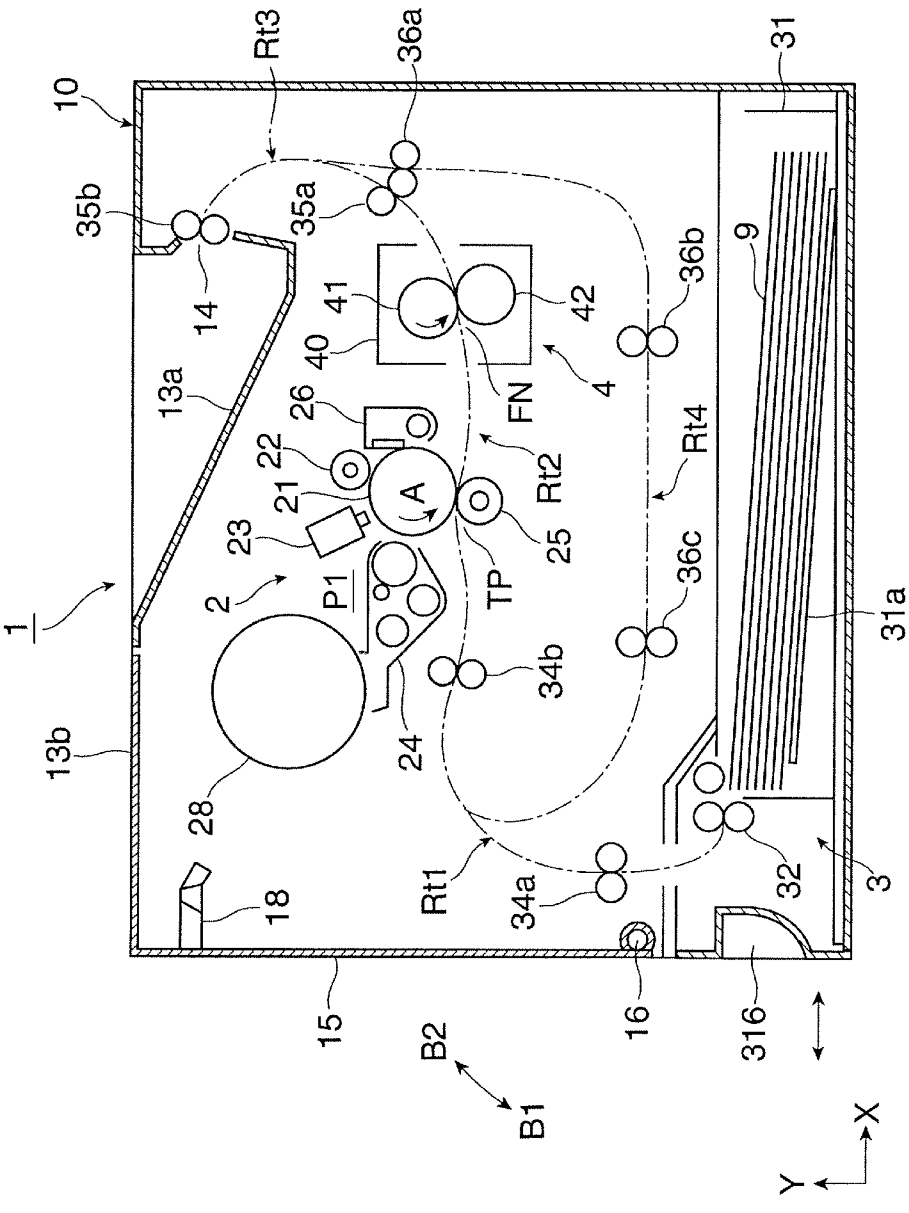
FIG. 2 is a schematic diagram illustrating an outline configuration of the image forming apparatus illustrated in FIG. 1, in a section taken along line II-II illustrated in FIG. 1.
Figure 3:
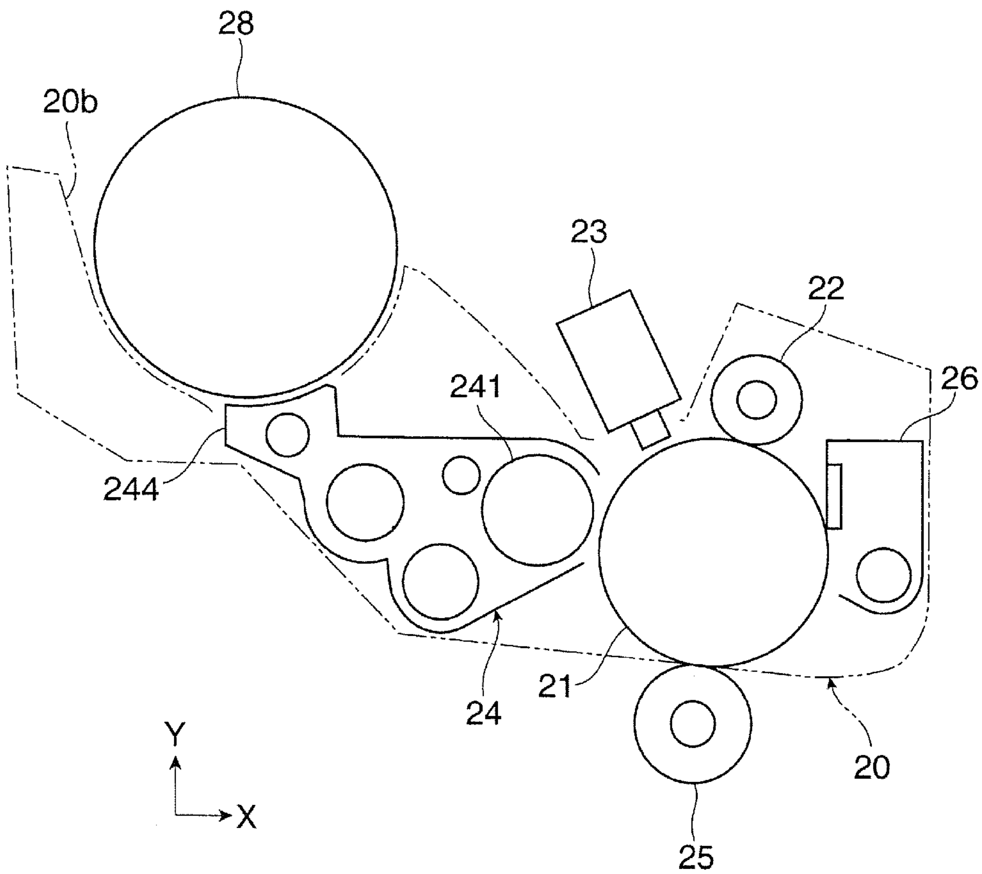
FIG. 3 is a schematic diagram of an imaging device and peripheral elements included in the image forming apparatus illustrated in FIG. 1.
Figure 4:
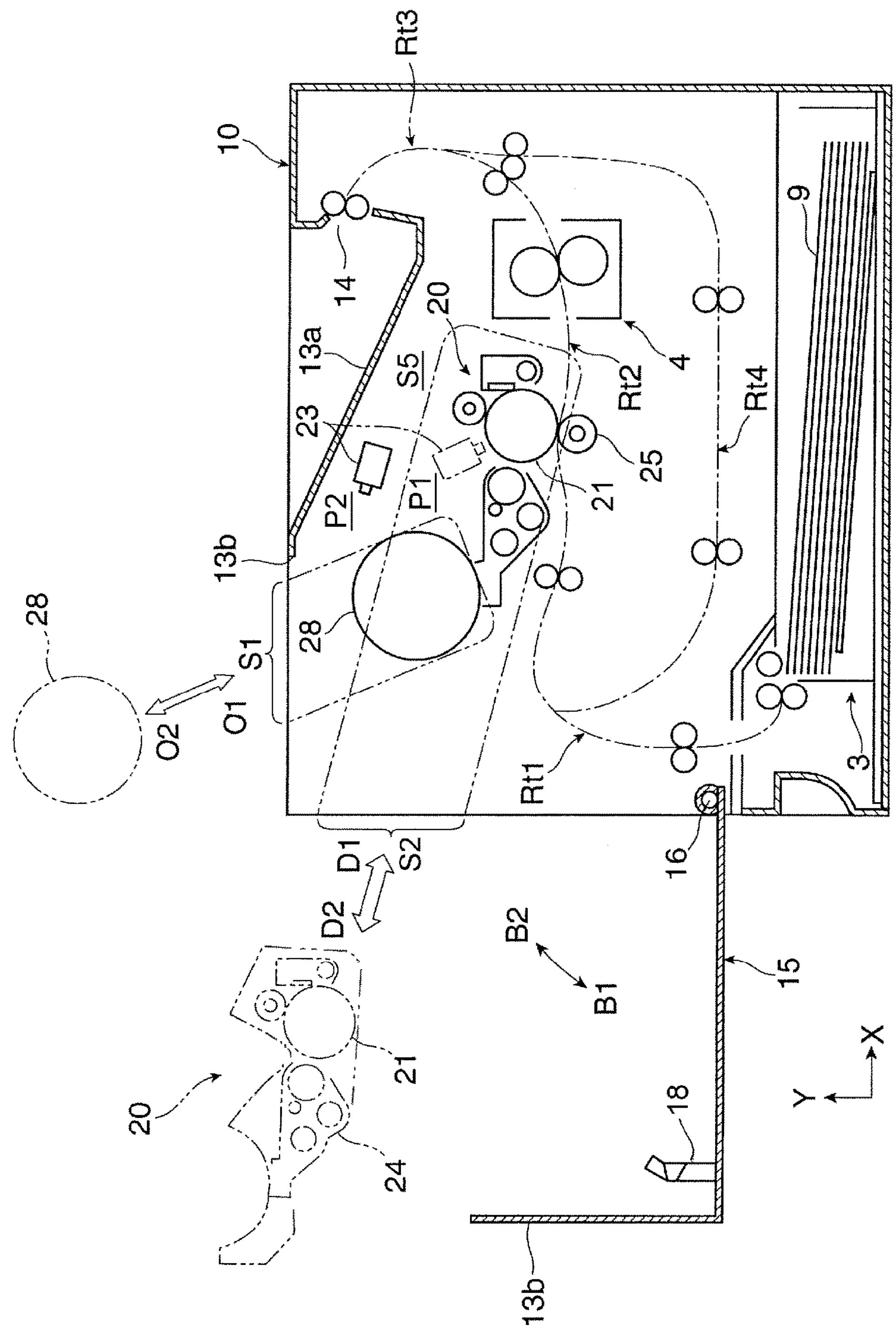
FIG. 4 is a schematic diagram illustrating detachable structures included in the image forming apparatus illustrated in FIG. 2.

FIGS. 1 to 4 illustrate a first exemplary embodiment of the present invention. FIG. 1 schematically illustrates an appearance of an image forming apparatus 1 according to the first exemplary embodiment. FIG. 2 illustrates an outline configuration of the image forming apparatus 1. FIG. 3 schematically illustrates an imaging device and peripheral elements included in the image forming apparatus 1. FIG. 4 schematically illustrates detachable structures included in the image forming apparatus 1.

Overall Configuration of Image Forming Apparatus

The image forming apparatus 1 is a printer as an exemplary image forming apparatus and forms, on a recording sheet 9 as an exemplary recording object, an image composed of developer (toner) on the basis of image information, such as characters, photographs, diagrams, and so forth, inputted from an external apparatus.

Referring to FIG. 2 and others, the image forming apparatus 1 has a housing 10 forming an apparatus body and includes thereinside an imaging device 2, a sheet feeding device 3, a fixing device 4, and so forth. The imaging device 2 forms a toner image, composed of toner as the developer, by an electrophotographic image-forming method or the like and transfers the toner image to the recording sheet 9 at a transfer position TP. The sheet feeding device 3 contains recording sheets 9 required and feeds the recording sheets 9 one by one to the transfer position TP defined in the imaging device 2. The fixing device 4 fixes the toner image transferred to the recording sheet 9.

Figure 5:
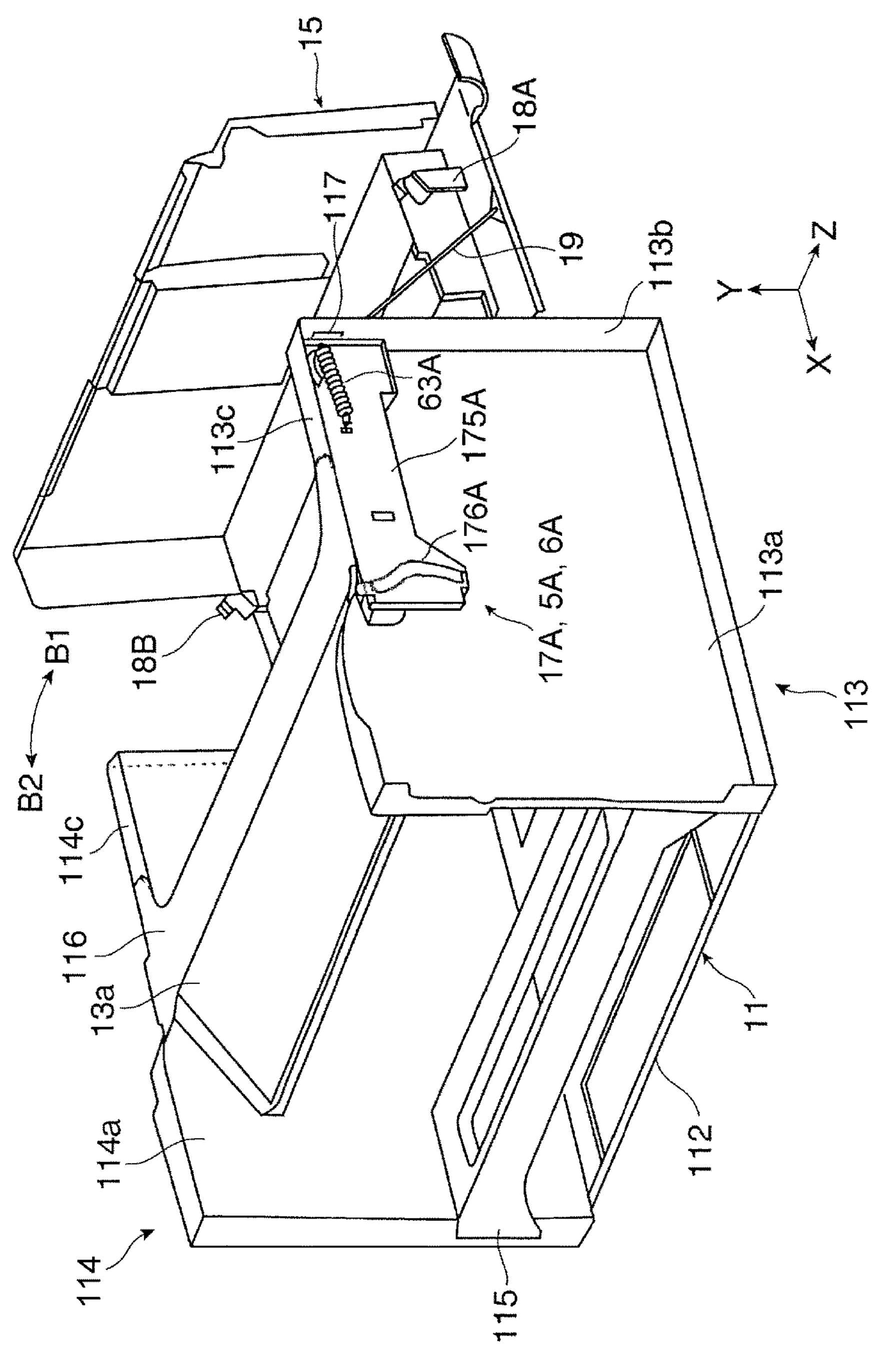
FIG. 5 is a schematic perspective view of a housing of the image forming apparatus illustrated in FIG. 1, with an openable/closable covering being open.

Referring to FIGS. 1, 5, and others, the housing 10 includes a structural member 11, exterior members 12, and other miscellaneous members. The housing 10 has an output receiving portion 13 at the top thereof. The output receiving portion 13 receives the recording sheets 9 having undergone image formation and outputted thereonto one by one. The output receiving portion 13 is a receiving surface including an inclined part 13*a* provided below an output port 14 provided in the housing 10, and a horizontal part 13*b* continuous with the upper end of the inclined part 13*a*. The recording sheets 9 outputted from the output port 14 are stacked on the output receiving portion 13.

Referring to FIGS. 2 and 3, the imaging device 2 includes a photoconductor drum 21 that rotates in a direction represented by an arrow A. The imaging device 2 further includes a charging device 22, an exposure device 23, a developing device 24, a transfer device 25, a cleaning device 26, and so forth that are arranged in that order around the photoconductor drum 21.

The charging device 22 employs a contact-charging method or the like and charges the peripheral surface (the outer peripheral surface serving as an image forming area) of the photoconductor drum 21 to have a required potential of required polarity. The exposure device 23 forms an electrostatic latent image on the charged peripheral surface of the photoconductor drum 21 by applying light generated on the basis of image information (signals) inputted to the image forming apparatus 1 by any of various methods. The developing device 24 develops the electrostatic latent image on the photoconductor drum 21 into a toner image by supplying the toner as the developer thereto from a developing roller 241. The developing device 24 is supplied with the developer from a developer container 28 through a refilling portion 244. The developer container 28 contains refill developer (containing toner, basically). The transfer device 25 employs a contact-transfer method or the like and electrostatically transfers the toner image formed on the photoconductor drum 21 to the recording sheet 9. The cleaning device 26 cleans the peripheral surface of the photoconductor drum 21 by removing unnecessary substances such as residual toner particles adhered thereto.

Referring to FIG. 3, the photoconductor drum 21, the charging device 22, the developing device 24, and the cleaning device 26 included in the imaging device 2 are integrated together as a detachable unit 20 (a part enclosed by a two-dot chain line) that is detachably attached to the housing 10 as to be described below. The developer container 28 is also a detachable component that is detachably attached to the housing 10 as to be described below. As illustrated in FIG. 3, the detachable unit 20 is provided with a supporting frame including an attaching portion 20*b* to which the developer container 28 is attached. The attaching portion 20*b* has a substantially semicylindrical concave shape.

The sheet feeding device 3 is positioned below and spaced apart from the imaging device 2 in the direction of gravitational force. The sheet feeding device 3 includes a sheet container 31, a feeding device 32, and so forth. The sheet container 31 contains plural recording sheets 9 stacked on a receiving plate 31*a* thereof. The recording sheets 9 are of a type, including size, kind, and so forth, required for image formation to be performed. The feeding device 32 feeds the recording sheets 9 one by one from the sheet container 31.

The sheet container 31 is drawably attached to the housing 10. According to need, plural sheet containers 31 may be provided. To draw the sheet container 31 from the housing 10, for example, a handhold 316 in the form of a hollow provided in an exterior member forming the sheet container 31 is held. The recording sheets 9 are each a recording medium, such as plain paper, coated paper, cardboard, or the like, cut into pieces of a predetermined size.

The fixing device 4 is spaced apart from the imaging device 2 in a substantially horizontal direction (a direction substantially parallel to the X coordinate axis). The fixing device 4 has a housing 40 having an inlet and an outlet and includes thereinside a heating rotatable member 41 and a pressing rotatable member 42 that are rotatable while being in contact with each other, and other miscellaneous elements.

Referring to FIG. 2, the heating rotatable member 41 rotates in a direction represented by an arrow illustrated therein. The heating rotatable member 41 is a fixing member intended for heating and provided in the form of a roller, a belt, or the like. The heating rotatable member 41 is heated by a heating device (not illustrated), and the peripheral surface thereof is retained at a required temperature. The pressing rotatable member 42 is another fixing member intended for pressure application and provided in the form of a roller, a belt, or the like. The pressing rotatable member 42 extends substantially parallel to the axial direction of the heating rotatable member 41 and is pressed against the heating rotatable member 41 with a required pressure, thereby rotating in such a manner as to follow the rotation of the heating rotatable member 41. In the fixing device 4, a part where the heating rotatable member 41 and the pressing rotatable member 42 are in contact with each other is defined as a fixing nip FN through which the recording sheet 9 having an unfixed toner image is made to pass so as to undergo a required fixing process (heating, pressure application, and so forth).

One-dot chain lines Rt illustrated in FIG. 2 represent sheet transport paths running through the housing 10 of the image forming apparatus 1 and along which the recording sheet 9 is transported.

The sheet transport paths Rt include a feed transport path Rt1 extending between the feeding device 32 of the sheet feeding device 3 and the transfer position TP of the imaging device 2 (the position where the photoconductor drum 21 faces the transfer device 25), a relay transport path Rt2 extending between the transfer position TP of the imaging device 2 and the fixing nip FN of the fixing device 4, an output transport path Rt3 extending between the fixing nip FN of the fixing device 4 and the output port 14 of the housing 10, a duplex transport path Rt4 extending between an end of the output transport path Rt3 (the point from which the path Rt4 branches off) and a halfway point of the feed transport path Rt1 (the point where the paths Rt4 and Rt1 meet), and so forth.

The feed transport path Rt1 is provided with plural pairs of transport rollers 34*a* and 34*b*, plural transport guide members (not illustrated), and so forth. The pair of transport rollers 34*b* serves as a pair of so-called registration rollers that feeds the recording sheet 9 to the transfer position TP of the imaging device 2 by starting to rotate in accordance with the timing of transfer.

The output transport path Rt3 is provided with plural pairs of transport rollers 35*a* and 35*b*, plural transport guide members (not illustrated), and so forth. The output transport path Rt3 generally curls upward. The pair of transport rollers 35*b* serves as a pair of output rollers provided before the output port 14 and with which the recording sheet 9 having undergone fixing is outputted onto the output receiving portion 13.

The duplex transport path Rt4 is provided with the pair of output rollers 35*b* provided at the terminal end of the output transport path Rt3 and being rotatable in the forward and backward directions, plural pairs of transport rollers 36*a*, 36*b*, and 36*c*, a path changing member (not illustrated) that changes the destination of the recording sheet 9, plural transport guide members (not illustrated), and so forth. The pair of transport rollers 36*a* shares a driving roller with the pair of transport rollers 35*a* provided on the output transport path Rt3.

Image Forming Process Performed by Image Forming Apparatus

The image forming apparatus 1 forms an image through a process described below. Herein, a basic image forming process of forming an image on one side of the recording sheet 9 (hereinafter, the process is also referred to as "simplex image forming process") is taken as an example.

In the image forming apparatus 1, when a controller (not illustrated) receives a command (a signal) for starting an image forming process from an information terminal or the like connected thereto over any of various communication devices, an imaging process in which the imaging device 2 forms a toner image is started.

First, in the imaging device 2, the photoconductor drum 21 starts to rotate, and the charging device 22 charges the peripheral surface of the photoconductor drum 21 to have a predetermined potential of predetermined polarity (in the first exemplary embodiment, negative polarity). Then, the exposure device 23 exposes the charged peripheral surface of the photoconductor drum 21 to light generated on the basis of image information, whereby an electrostatic latent image of a required pattern is formed thereon. Subsequently, the developing device 24 supplies, from the developing roller 241, the toner as the developer charged to have required polarity (in the first exemplary embodiment, positive polarity) to the electrostatic latent image formed on the peripheral surface of the photoconductor drum 21, thereby visualizing the electrostatic latent image into a toner image. Thus, a toner image is formed on the photoconductor drum 21.

Subsequently, in the imaging device 2, the photoconductor drum 21 that is rotating carries the toner image to the transfer position TP facing the transfer device 25. Meanwhile, in the sheet feeding device 3, a recording sheet 9 is fed into the feed transport path Rt1 in accordance with the timing of transfer and is transported to the transfer position TP of the imaging device 2. Then, at the transfer position TP of the imaging device 2, the transfer device 25 generates a transfer electric field, with which the toner image on the photoconductor drum 21 is electrostatically transferred to one side of the recording sheet 9. In the imaging device 2, after the above transfer process and other relevant timings, the cleaning device 26 cleans the peripheral surface of the photoconductor drum 21.

Subsequently, the recording sheet 9 having the toner image transferred thereto is fed into the relay transport path Rt2 while receiving a transport force between the photoconductor drum 21 and the transfer device 25 that are rotating and is transported to the fixing device 4. In the fixing device 4, the recording sheet 9 is made to pass through the fixing nip FN defined between the heating rotatable member 41 and the pressing rotatable member 42 that are rotating. When the recording sheet 9 passes through the fixing nip FN, the toner forming the toner image on the one side of the recording sheet 9 is heated under pressure and is melted, thereby being fixed on the recording sheet 9.

The recording sheet 9 having undergone the above fixing process is transported from the fixing nip FN of the fixing device 4 into the output transport path Rt3, is outputted from the output port 14 of the housing 10 by the pair of output rollers 35*b*, and is eventually received by the output receiving portion 13.

Through the above process, a monochrome image composed of toner having a single color is formed on one side of one recording sheet 9, and the simplex image forming process is completed. If a command for executing an image forming process on plural recording sheets 9 is issued, the above process is repeated for that number of recording sheets 9.

In a duplex image forming process in which images are formed on the front and back sides, respectively, of the recording sheet 9, the above simplex image forming process is performed first. Then, the recording sheet 9 having the fixed toner image on one side (a first side, or the front side) thereof is fed into the duplex transport path Rt4.

In this step, the recording sheet 9 having undergone the fixing of the toner image on the one side thereof projects by a certain length from the output port 14 and is temporarily stopped with a position thereof near the leading end being nipped between the pair of output rollers 35*b*. Then, so-called switch-back transport is performed in which the path switching member changes its position so as to change the destination of transport and the pair of output rollers 35*b* rotate backward. Thus, the trailing end of the recording sheet 9 is fed into the duplex transport path Rt4.

The recording sheet 9 fed into the duplex transport path Rt4 is transported along the duplex transport path Rt4 to a position before the pair of transport rollers 34*b* provided on the feed transport path Rt1 where the duplex transport path Rt4 meets the feed transport path Rt1. Then, the recording sheet 9 whose front and back sides have been reversed in the above process is fed into the feed transport path Rt1.

The recording sheet 9 fed into the feed transport path Rt1 again undergoes the same process as the above simplex image forming process. Specifically, the recording sheet 9 is transported to the transfer position TP of the imaging device 2 in accordance with the timing of transfer, thereby receiving a toner image on the other side (a second side, or the back side). Then, the recording sheet 9 is transported into the fixing device 4, where the toner image is fixed. Lastly, the recording sheet 9 having the respective images on the front and back sides thereof is outputted onto the output receiving portion 13, as in the above simplex image forming process.

Through the above process, monochrome images composed of toner having a single color are formed on the front and back sides, respectively, of one recording sheet 9, and the duplex image forming process is completed.

Configuration of Detachable Structures

In the image forming apparatus 1, referring to FIG. 4, the detachable unit 20, which form a part of the imaging device 2, and the developer container 28 are detachably attached to the housing 10.

To attach or detach the detachable unit 20 and the developer container 28 to or from the housing 10, an openable/closable covering 15 forming a part of the housing 10 is to be opened first as illustrated in FIGS. 4, 5, and others.

Referring to FIGS. 1, 4, and others, the openable/closable covering 15 is openable and closable by being swung in directions represented by arrows B1 and B2, respectively, on a support shaft 16 provided on one side face (for example, on the side facing the operator) of the housing 10. When the openable/closable covering 15 is opened by being swung in the direction of the arrow B1, a region in the housing 10 that is behind part of the one side face and below part of the top face (a region below the horizontal part 13*b* of the output receiving portion 13) is exposed to the outside (see FIGS. 4 and 5).

Referring to FIG. 4, the space in the housing 10 of the image forming apparatus 1 includes a first attaching/detaching space S1 as a passage through which the developer container 28 passes when the developer container 28 is attached to or detached from the housing 10, and a second attaching/detaching space S2 as a passage through which the detachable unit 20 passes when the detachable unit 20 is attached to or detached from the housing 10.

The first attaching/detaching space S1 extends obliquely from the attaching portion 20*b*, to which the developer container 28 is attached, toward part of the top face of the housing 10. Hence, to attach or detach the developer container 28 to or from the housing 10, the developer container 28 is moved obliquely in a direction represented by an arrow O1 or O2, i.e., substantially in the long-side direction of the first attaching/detaching space S1.

The second attaching/detaching space S2 extends obliquely from an attaching portion, to which the detachable unit 20 is attached, toward part of the one side face of the housing 10. Hence, to attach or detach the detachable unit 20 to or from the housing 10, the detachable unit 20 is moved obliquely in a direction represented by an arrow D1 or D2, i.e., substantially in the long-side direction of the second attaching/detaching space S2.

The first attaching/detaching space S1 and the second attaching/detaching space S2 overlap each other, with lower part of the first attaching/detaching space S1 coinciding with part of the second attaching/detaching space S2. This is because the attaching portion 20*b* to which the developer container 28 is attached forms a part of the detachable unit 20, as described above.

In the image forming apparatus 1, the developer container 28 is independently attachable and detachable to and from the housing 10 with no problem through the first attaching/detaching space S1.

In contrast, to attach or detach the detachable unit 20 to or from the housing 10, the developer container 28 needs to be detached from the detachable unit 20 before the detachable unit 20 is attached or detached through the second attaching/detaching space S2.

Even if it is attempted to attach or detach the detachable unit 20 to or from the housing 10 with the developer container 28 attached to the detachable unit 20, part of the developer container 28 projects from the second attaching/detaching space S2 and therefore interferes with peripheral elements around the second attaching/detaching space S2, preventing the detachable unit 20 from advancing through the second attaching/detaching space S2.

Furthermore, in the image forming apparatus 1 before the detachable unit 20 is attached to or detached from the housing 10, the exposure device 23 not included in the detachable unit 20 is present at such a position (the position of the exposure device 23 illustrated by two-dot chain lines in FIG. 4) as to hinder the movement of the detachable unit 20 advancing through the second attaching/detaching space S2.

Therefore, in the image forming apparatus 1, simultaneously with the attaching or detaching of the detachable unit 20 to or from the housing 10, a moving mechanism 5, to be described below, moves the exposure device 23 from an exposure position P1 (the position of the exposure device 23 illustrated by solid lines in FIG. 2 or by two-dot chain lines in FIG. 4) where the exposure device 23 forms an electrostatic latent image to a retracted position P2 (the position of the exposure device 23 illustrated by solid lines in FIG. 4) where the exposure device 23 is retracted so as not to hinder the movement of the detachable unit 20.

Configuration of Moving Mechanism

Referring to FIG. 4 and others, the moving mechanism 5 is a mechanism that moves the exposure device 23 between the exposure position P1 as a first position and the retracted position P2 as a second position where the exposure device 23 takes a stationary orientation different from a stationary orientation for the first position P1.

Figure 6:
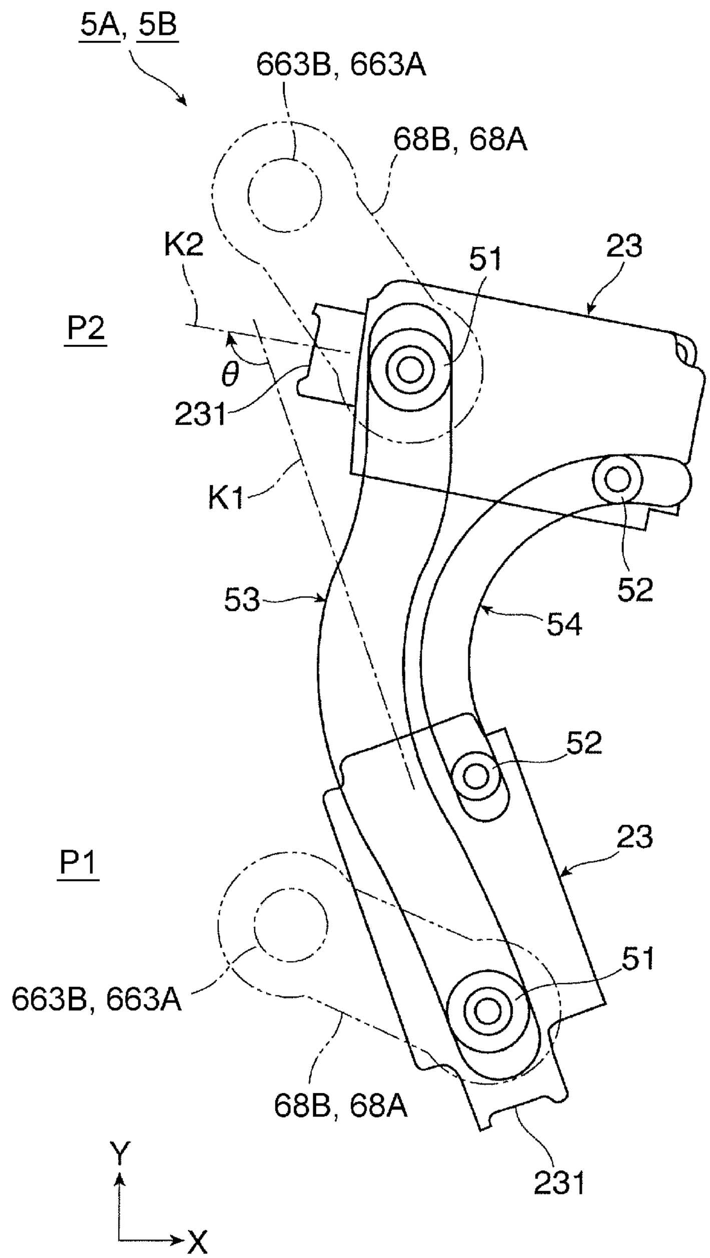
FIG. 6 is a schematic diagram of a moving mechanism, illustrating different states thereof established at different positions.

Referring to FIG. 6 and others, the moving mechanism 5 includes at least a first projection 51 and a second projection 52 provided at different positions, respectively, of the exposure device 23; a first guiding groove 53 that guides the first projection 51 when the exposure device 23 is moved between the exposure position P1 as the first position and the retracted position P2 as the second position; and a second guiding groove 54 that guides the second projection 52 when the exposure device 23 is moved between the exposure position P1 as the first position and the retracted position P2 as the second position.

The moving mechanism 5 is one of two moving mechanisms 5A and 5B (a left moving mechanism 5A and a right moving mechanism 5B) provided at two respective positions that face respective left and right long-side ends of the exposure device 23.

The moving mechanisms 5 (5A and 5B) move the exposure device 23 between the exposure position P1 and the retracted position P2 in conjunction with the opening and closing of the openable/closable covering 15.

To realize the above interlocking function, the image forming apparatus 1 employs a link mechanism 6, to be described below, as a device for converting a swinging motion of the openable/closable covering 15 that is opened or closed into power that causes the moving mechanisms 5A and 5B to make the above moving motion and transmitting the power to the moving mechanisms 5A and 5B.

The first guiding groove 53 and the second guiding groove 54 of each of the moving mechanisms 5A and 5B are curved guiding grooves having different required lengths and different general shapes, respectively.

Referring to FIG. 4, the retracted position P2 as the second position is defined within a narrow space S5 extending obliquely between the second attaching/detaching space S2 and the inclined part 13*a* of the output receiving portion 13.

The moving mechanisms 5A and 5B basically behave as follows, in conjunction with the opening and closing of the openable/closable covering 15.

Figure 13A:
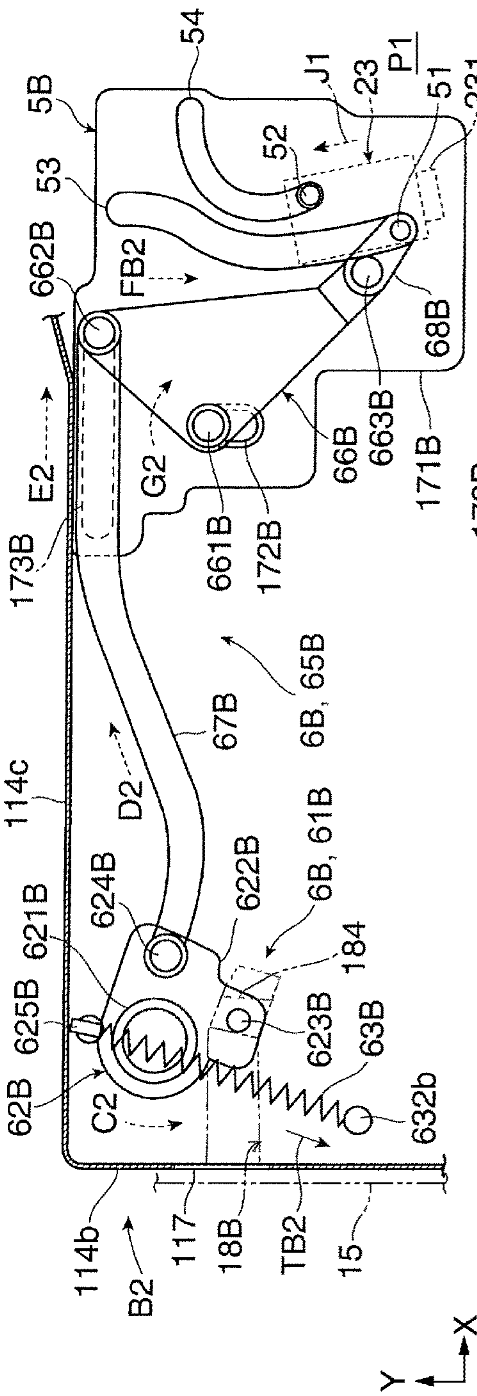
FIG. 13A is a schematic diagram illustrating a state where the exposure device has been moved to an exposure position by the moving mechanism included in a left part of the moving device.
Figure 13B:
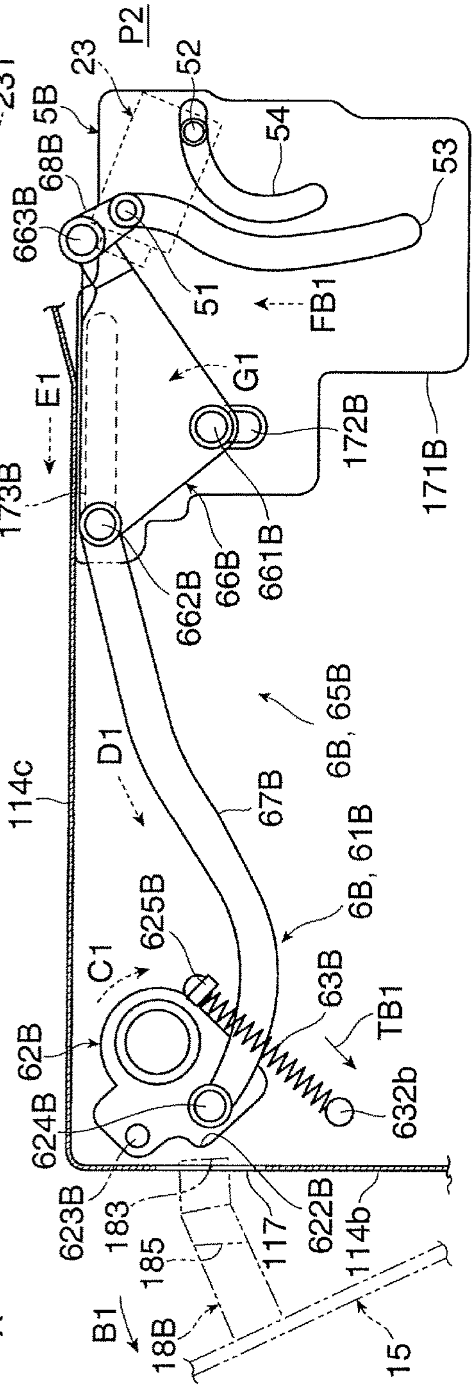
FIG. 13B is a schematic diagram illustrating a state where the exposure device has been moved to a retracted position by the moving mechanism included in the left part of the moving device.
Figures 14A, 14B:
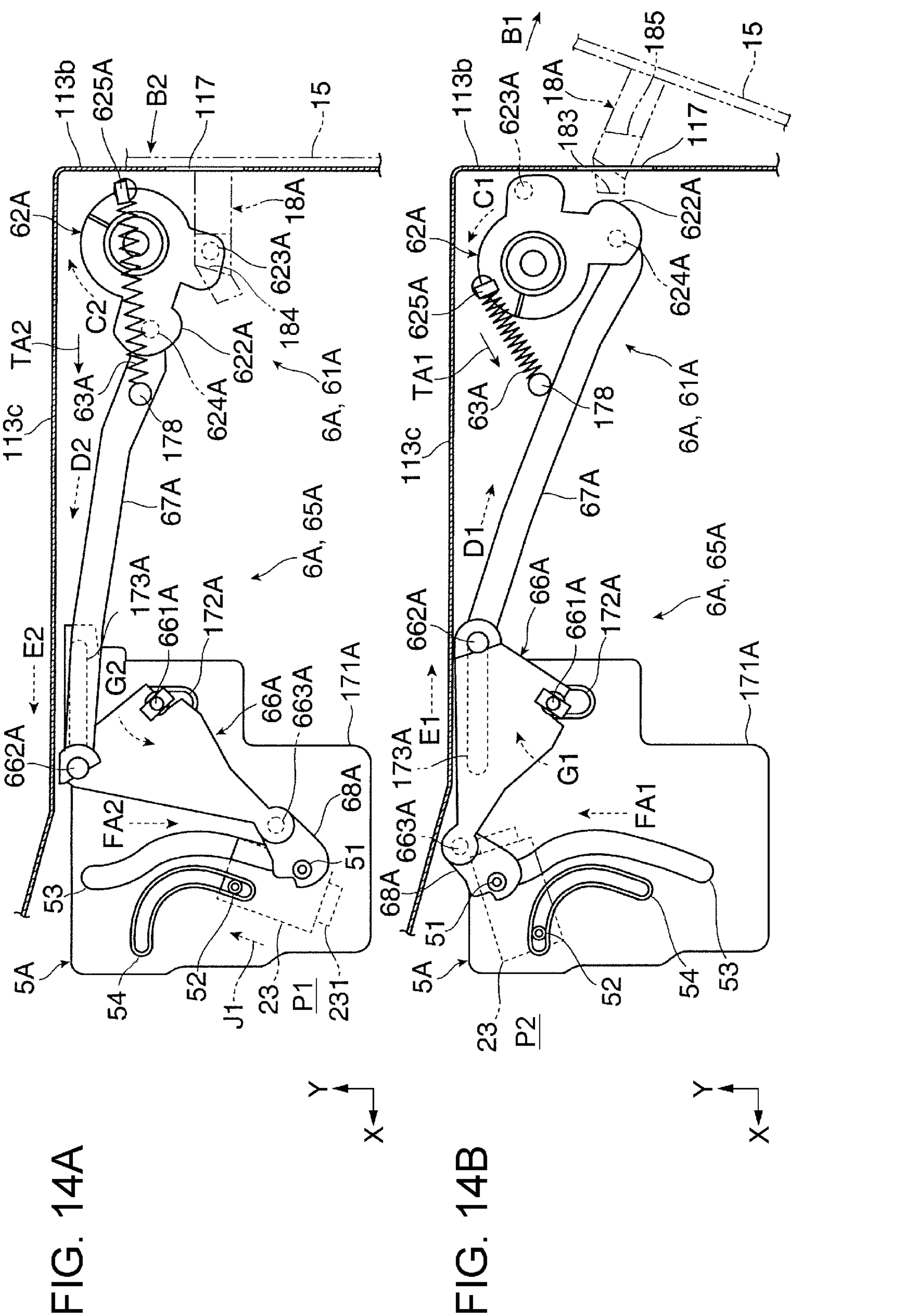
FIG. 14A is a schematic diagram illustrating a state where the exposure device has been moved to the exposure position by the moving mechanism included in a right part of the moving device.
FIG. 14B is a schematic diagram illustrating a state where the exposure device has been moved to the retracted position by the moving mechanism included in the right part of the moving device.
Figure 15:
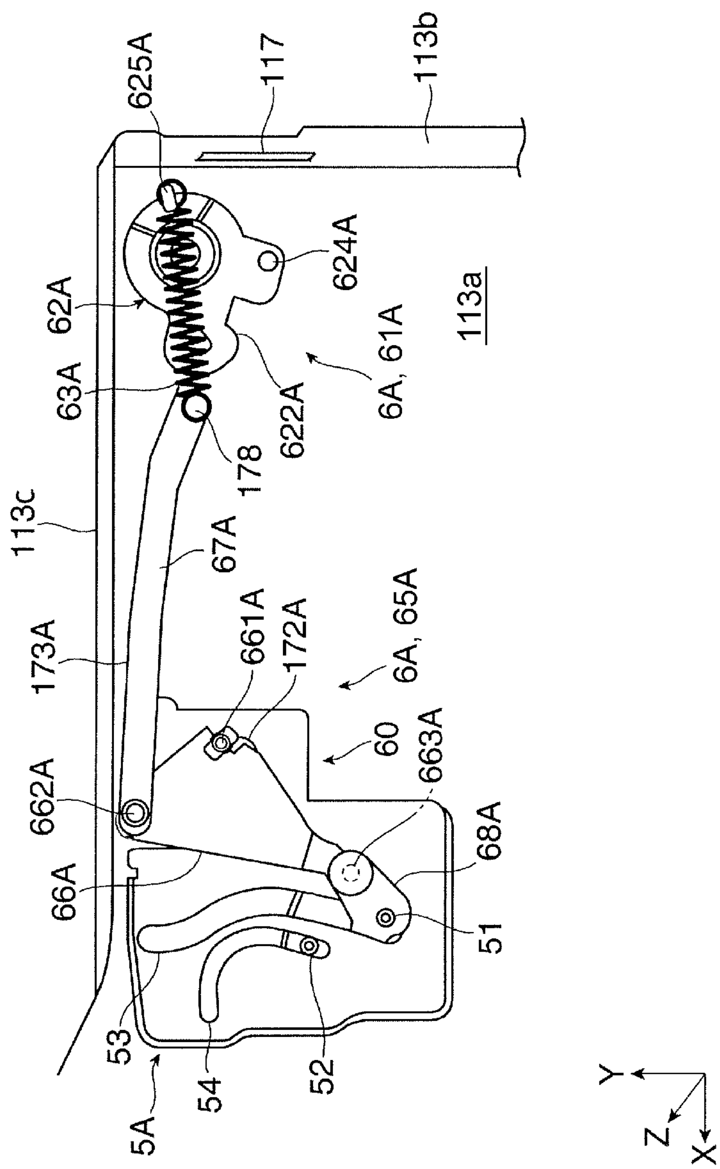
FIG. 15 is a schematic perspective view of the link mechanism and other relevant elements attached to the housing.

Referring to FIGS. 2, 13B, 14B, and others, when the openable/closable covering 15 is opened, the moving mechanisms 5A and 5B behave in such a manner as to move the exposure device 23 from the exposure position P1 to the retracted position P2 in conjunction with the opening of the openable/closable covering 15.

In contrast, referring to FIGS. 4, 13A, 14A, and others, when the openable/closable covering 15 is closed, the moving mechanisms 5A and 5B behave in such a manner as to move the exposure device 23 from the retracted position P2 to the exposure position P1 in conjunction with the closing of the openable/closable covering 15.

Figure 7:
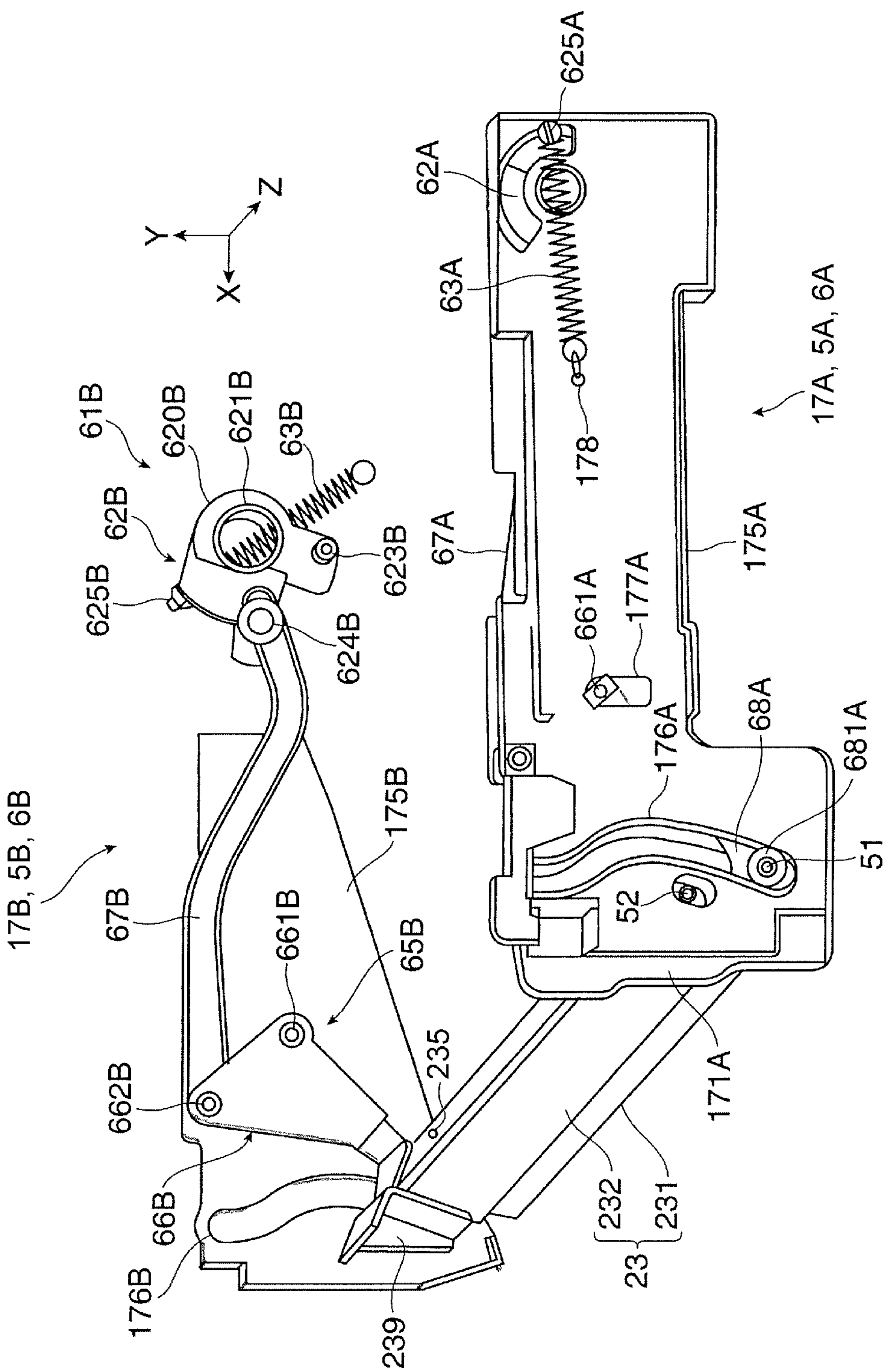
FIG. 7 is a schematic perspective view of a moving device including the moving mechanism and a link mechanism.

Referring to FIGS. 5, 7, and others, the moving mechanisms 5A and 5B are each integrated with the link mechanism 6 into a moving device 17 that is provided on the housing 10 of the image forming apparatus 1.

In the first exemplary embodiment, as illustrated in FIGS. 5, 7, and others, the moving device 17 is one of two moving devices 17A and 17B (a left moving device 17A and a right moving device 17B) each including the moving mechanism 5 (5A or 5B) and the link mechanism 6 (6A or 6B). The two moving devices 17A and 17B are each attached to an upper part of a corresponding one of two side faces (for example, left and right side faces) 113 and 114 of the housing 10 of the image forming apparatus 1 that face the respective long-side ends of the exposure device 23.

The left and right side faces 113 and 114 of the housing 10 are each shaped into a member including a substantially rectangular body portion 113*a* or 114*a* and folded portions (a side folded portion 113*b* or 114*b*, an upper folded portion 113*c* or 114*c*, and so forth) obtained by folding substantially four sides of the body portion 113*a* or 114*a* outward. The body portions 113*a* and 114*a* of the left and right side faces 113 and 114 each have a cut (not illustrated) for allowing the moving mechanism 5A or 5B to move the exposure device 23.

Referring to FIG. 5, the housing 10 includes a bottom portion 112, a side-face-connecting portion 115 that connects lower portions of the left and right side faces 113 and 114 to each other, and a top connecting portion 116 that connects top portions of the left and right side faces 113 and 114 to each other.

The moving devices 17A and 17B include respective first supporting members 171A and 171B attached to outer surfaces of the respective left and right side faces 113 and 114 in such a manner as to face the respective cuts (not illustrated), and respective second supporting members 175A and 175B attached to outer surfaces of the respective left and right side faces 113 and 114 and positioned on the outer side of the respective first supporting members 171A and 171B.

Figure 8:
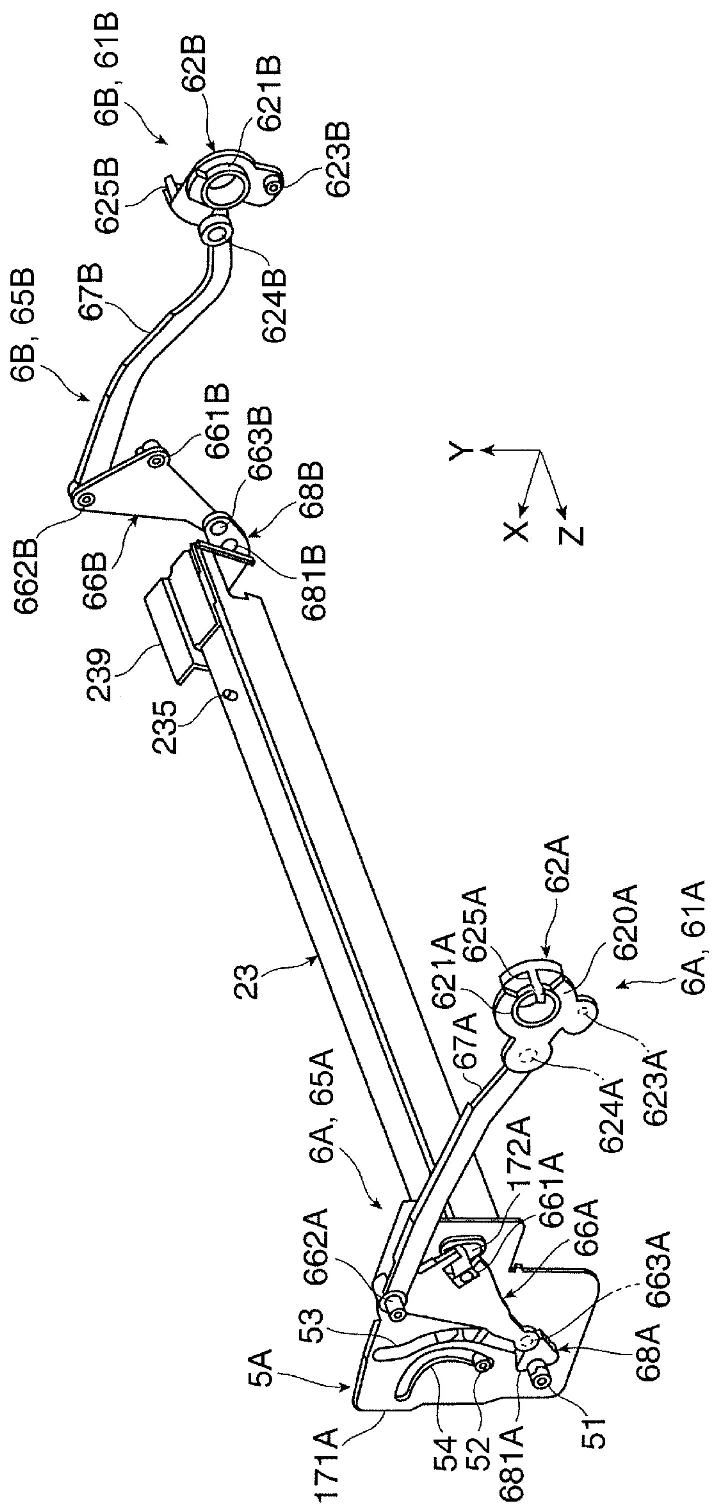
FIG. 8 is a schematic perspective view of the moving device illustrated in FIG. 7, with some of components thereof not illustrated.

In FIG. 7, the first supporting member 171B on the right side is not illustrated. In FIG. 8, only the first supporting member 171A on the left side is illustrated, and the first supporting member 171B on the right side and the second supporting members 175A and 175B on the left and right sides are not illustrated.

Part of each moving mechanism 5 (5A or 5B) and part of each link mechanism 6 (6A or 6B) are positioned between the first supporting member 171A or 171B and the second supporting member 175A or 175B.

Referring to FIGS. 12A, 12B, 13A to 14B, and others, the first supporting members 171A and 171B each have the first guiding groove 53 and the second guiding groove 54 included in a corresponding one of the moving mechanisms 5A and 5B. The first guiding groove 53 and the second guiding groove 54 may be provided at least in each of two plate-like supporting members that face the respective long-side ends of the exposure device 23.

Configuration of Link Mechanism

Referring to FIGS. 8, 9, 12A, 12B, 13A to 14B, and others, the link mechanism 6 is one of the two link mechanisms 6A and 6B (the left link mechanism 6A and the right link mechanism 6B) provided in correspondence with the left moving mechanism 5A and the right moving mechanism 5B.

The link mechanisms 6A and 6B include respective left and right power input portions 61A and 61B to which the power of the swinging motion generated at the opening or closing of the openable/closable covering 15 is inputted, and respective left and right power transmitting portions 65A and 65B that convert the power inputted to the power input portions 61A and 61B into power that causes the moving mechanisms 5A and 5B to make the moving motion and transmit the power to the respective moving mechanisms 5A and 5B.

Referring to FIGS. 5, 7 to 9, 13A to 14B, and others, the power input portions 61A and 61B include respective left and right rotatable members 62A and 62B that rotate at the contact with respective left and right contact acting members 18A and 18B provided on the openable/closable covering 15.

The left rotatable member 62A is rotatably supported by the second supporting member 175A of the left moving device 17A and is positioned at an upper corner of the outer surface of the left side face 113 in such a manner as to face the openable/closable covering 15. The right rotatable member 62B is rotatably supported by the right side face 114 at an upper corner of the outer surface thereof in such a manner as to face the openable/closable covering 15.

Figure 9:
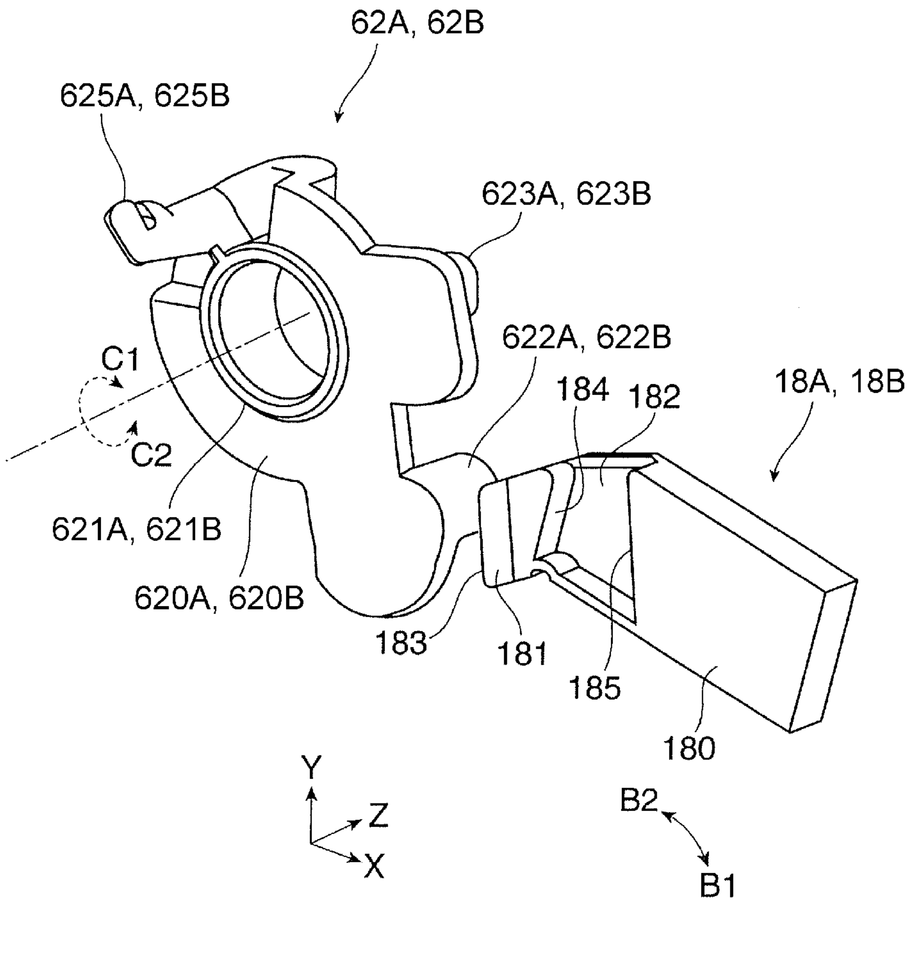
FIG. 9 is a schematic perspective view of a component included in the link mechanism and a contact acting member provided on the openable/closable covering.

Referring to FIGS. 7 to 9 and others, the rotatable members 62A and 62B include respective disc-shaped body portions 620A and 620B. The body portions 620A and 620B includes respective cylindrical shaft portions 621A and 621B fitted onto and rotatably supported by respective rotating shafts (not illustrated) provided on the second supporting member 175A and the right side face 114, respectively.

Referring to FIGS. 7 to 9 and others, the rotatable members 62A and 62B further include respective contact receiving portions 622A and 622B, respective acting projections 623A and 623B, respective connecting pins 624A and 624B, and respective spring catching portions 625A and 625B around the shaft portions 621A and 621B of the respective body portions 620A and 620B. The contact receiving portions 622A and 622B and the acting projections 623A and 623B are to come into contact with the respective contact acting members 18A and 18B provided on the openable/closable covering 15. The connecting pins 624A and 624B are each connected to an end of a corresponding one of joining links 67A and 67B to be described below. The spring catching portions 625A and 625B each catch an end of a corresponding one of tension springs (such as coil springs) 63A and 63B to be described below.

Since the end of each of the tension springs 63A and 63B is hooked on a corresponding one of the spring catching portions 625A and 625B of the rotatable members 62A and 62B, the rotatable members 62A and 62B continue to be pulled in respective required directions with respective required tensions (TA and TB).

Referring to FIGS. 5, 9, 13A to 14B, and others, the contact acting members 18A and 18B provided on the openable/closable covering 15 are each a member shaped to include a plate-like body portion 180 extending upright from a predetermined position at a corresponding one of the left and right ends of the inner surface of the openable/closable covering 15, a bent tip portion 181 extending obliquely downward from the tip of the body portion 180, and a depressed portion 182 provided between the body portion 180 and the bent tip portion 181 and being widened downward.

The contact acting members 18A and 18B each further include a contact surface portion 183 at the tip of the bent tip portion 181. When the openable/closable covering 15 is closed, the contact surface portion 183 comes into contact with and presses a corresponding one of the contact receiving portions 622A and 622B of the rotatable members 62A and 62B.

An inner wall, nearer to the contact surface portion 183, of the depressed portion 182 of each of the contact acting members 18A and 18B is inclined outward while extending downward and serves as a drawing inclined surface 184. When the openable/closable covering 15 is opened, the drawing inclined surface 184 comes into contact with a corresponding one of the acting projections 623A and 623B of the rotatable members 62A and 62B. Another inner wall, farther from the contact surface portion 183, of the depressed portion 182 is inclined outward while extending downward and serves as a pressing inclined surface 185. When the openable/closable covering 15 is closed, the pressing inclined surface 185 comes into contact with a corresponding one of the acting projections 623A and 623B of the rotatable members 62A and 62B.

Referring to FIGS. 5, 13A to 14B, and others, the side folded portions 113*b* and 114*b* of the side faces 113 and 114 of the housing 10 have, at respective upper positions, respective passage openings 117 that allow the respective contact acting members 18A and 18B moving with the opening or closing of the openable/closable covering 15 to pass therethrough. The rotatable members 62A and 62B are positioned near the respective passage openings 117.

Referring to FIG. 5, the orientation of the openable/closable covering 15 in the open state is retained by a flexible member 19 having a predetermined length and that connects part of the openable/closable covering 15 and part of the side folded portion 113*b*.

Referring to FIGS. 8, 13A to 14B, and others, the power transmitting portions 65A and 65B include respective left and right rotatable links 66A and 66B that rotate near the respective moving mechanisms 5A and 5B, the respective left and right joining links 67A and 67B that each join a part of a corresponding one of the rotatable members 62A and 62B of the power input portions 61A and 61B and a part of a corresponding one of the rotatable links 66A and 66B, and respective left and right connecting links 68A and 68B that each connect another part of a corresponding one of the rotatable links 66A and 66B and a corresponding one of the first projections 51 guided by the first guiding grooves 53 of the moving mechanisms 5A and 5B.

The left and right rotatable links 66A and 66B are each a plate-like member generally having a substantially triangular shape. The rotatable links 66A and 66B are each provided with a corresponding one of fulcrum pins 661A and 661B that is provided near a first apex thereof. The rotatable links 66A and 66B are rotatably supported at the fulcrum pins 661A and 661B thereof positioned in respective supporting grooves 172A and 172B provided in the respective first supporting members 171A and 171B of the left and right moving devices 17A and 17B.

Furthermore, the rotatable links 66A and 66B are each provided with a corresponding one of first connecting pins 662A and 662B that is provided near a second apex thereof. The rotatable links 66A and 66B are supported such that when exposure device 23 is moved between the two positions P1 and P2, the first connecting pins 662A and 662B are guided along respective guiding grooves 173A and 173B provided in the respective first supporting members 171A and 171B.

The left and right joining links 67A and 67B are each a long narrow plate-like member that is curved in a required shape. One end of each of the joining links 67A and 67B is rotatably attached to a corresponding one of the connecting pins 624A and 624B provided on the rotatable members 62A and 62B. The other end of each of the joining links 67A and 67B is rotatably attached to a corresponding one of the first connecting pins 662A and 662B that is provided near the second apex of a corresponding one of the rotatable links 66A and 66B.

The left and right connecting links 68A and 68B are each an oval plate-like member and are each provided at one end thereof with a corresponding one of guided portions 681A and 681B in which the respective first projections 51 of the exposure device 23 are fitted. The guided portions 681A and 681B are guided along the respective first guiding grooves 53 of the moving mechanisms 5A and 5B. The other end of each of the connecting links 68A and 68B is rotatably attached to a corresponding one of second connecting pins 663A and 663B that is provided near a third apex of a corresponding one of the rotatable links 66A and 66B. The one end of each of the connecting links 68A and 68B is rotatably attached to a corresponding one of the guided portions 681A and 681B.

Referring to FIG. 7, the second supporting members 175A and 175B have respective complementary first guiding grooves 176A and 176B at respective positions thereof coinciding with the respective first guiding grooves 53 provided in the respective first supporting members 171A and 171B and included in the respective moving mechanisms 5A and 5B. The complementary first guiding grooves 176A and 176B have the same shapes as the respective first guiding grooves 53. The complementary first guiding grooves 176A and 176B complementarily guide the respective guided portions 681A and 681B of the connecting links 68A and 68B that are positioned therein.

Furthermore, referring to FIG. 7, the second supporting members 175A and 175B have respective complementary supporting grooves 177A and 177B at respective positions thereof coinciding with the respective supporting grooves 172A and 172B provided in the respective first supporting members 171A and 171B. The complementary supporting grooves 177A and 177B have the same shapes as the respective supporting grooves 172A and 172B. The complementary supporting grooves 177A and 177B complementarily guide the respective fulcrum pins 661A and 661B (i.e., members that serve as the fulcrum pins 661A and 661B) of the rotatable links 66A and 66B included in the link mechanisms 6A and 6B that are positioned therein.

Furthermore, referring to FIG. 7, the second supporting member 175A has a securing portion 178 that secures the other end of the tension spring 63A. As illustrated in FIGS. 7 and 14B, the securing portion 178 is positioned away from the rotatable member 62A toward the rotatable link 66A and is at substantially the same level as the center of rotation of the rotatable member 62A in the horizontal direction.

An end 632*b* of the tension spring 63B is secured by a securing portion (not illustrated) provided on the body portion 114*a* of the side face 114 of the housing 10. As illustrated in FIGS. 7 and 13A, the securing portion (not illustrated) is positioned away from the rotatable member 62B toward the lower side and is staggered with respect to the center of rotation of the rotatable member 62B toward the side opposite the rotatable link 66B.

Features of Link Mechanism

The link mechanisms 6 (6A and 6B) include the respective rotatable links 66A and 66B and respective link mechanism portions 60. The rotatable links 66A and 66B are provided with the respective fulcrum pins 661A and 661B, the respective first connecting pins 662A and 662B, and the respective second connecting pins 663A and 663B. The rotatable links 66A and 66B are rotatable on the respective fulcrum pins 661A and 661B. The link mechanism portions 60 include the respective guiding grooves 173A and 173B and the respective supporting grooves 172A and 172B that are provided in the respective first supporting members 171A and 171B. The link mechanism portions 60 have the following features.

Figure 12A:
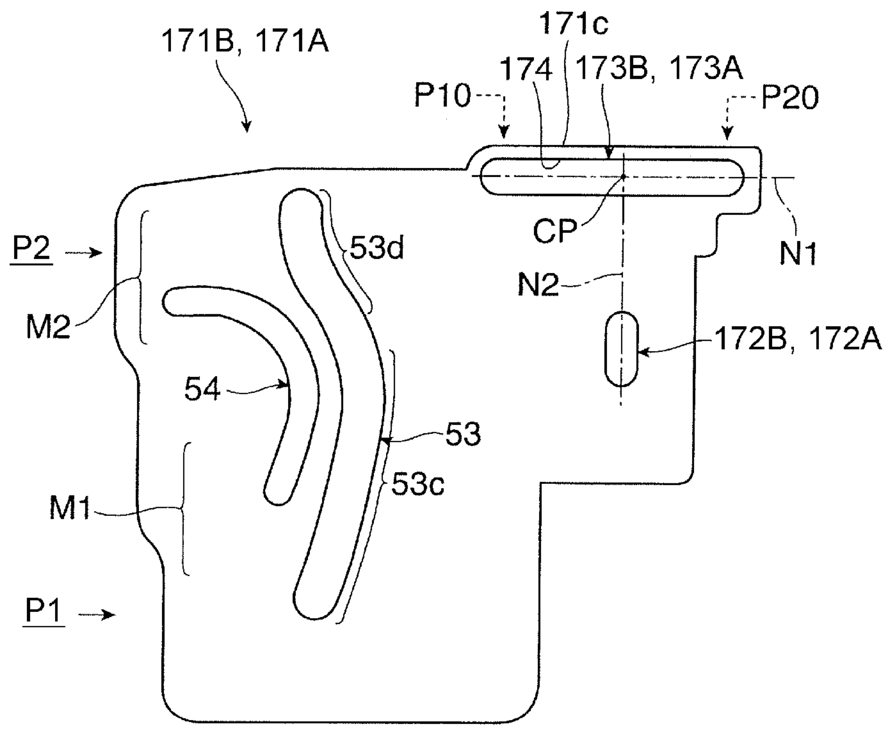
FIG. 12A is a schematic side view of a component included in the moving device illustrated in FIG. 7, illustrating relevant elements, such as guiding grooves, included in the moving mechanism and in the link mechanism.
Figure 12B:
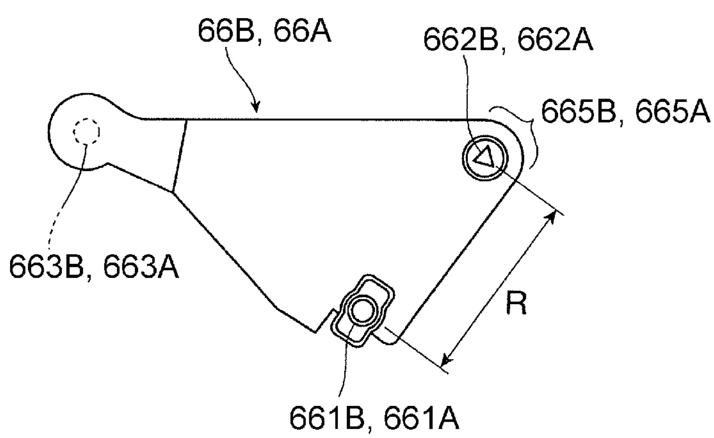
FIG. 12B is a schematic side view of the rotatable link.

Referring to FIGS. 12A and 12B, the guiding grooves 173A and 173B each include a long-side guiding portion 174 shaped with a curvature that is greater than the curvature of an arc or substantially arc shape defined by a radius corresponding to a distance R between the fulcrum pin 661A or 661B and the first connecting pin 662A or 662B of the rotatable link 66A or 66B. As illustrated in FIG. 12A, each of the supporting grooves 172A and 172B is an oblong or substantially oblong groove extending in a direction N2 intersecting a direction N1 in which the long-side guiding portion 174 of the guiding groove 173A or 173B extends.

Figure 18:
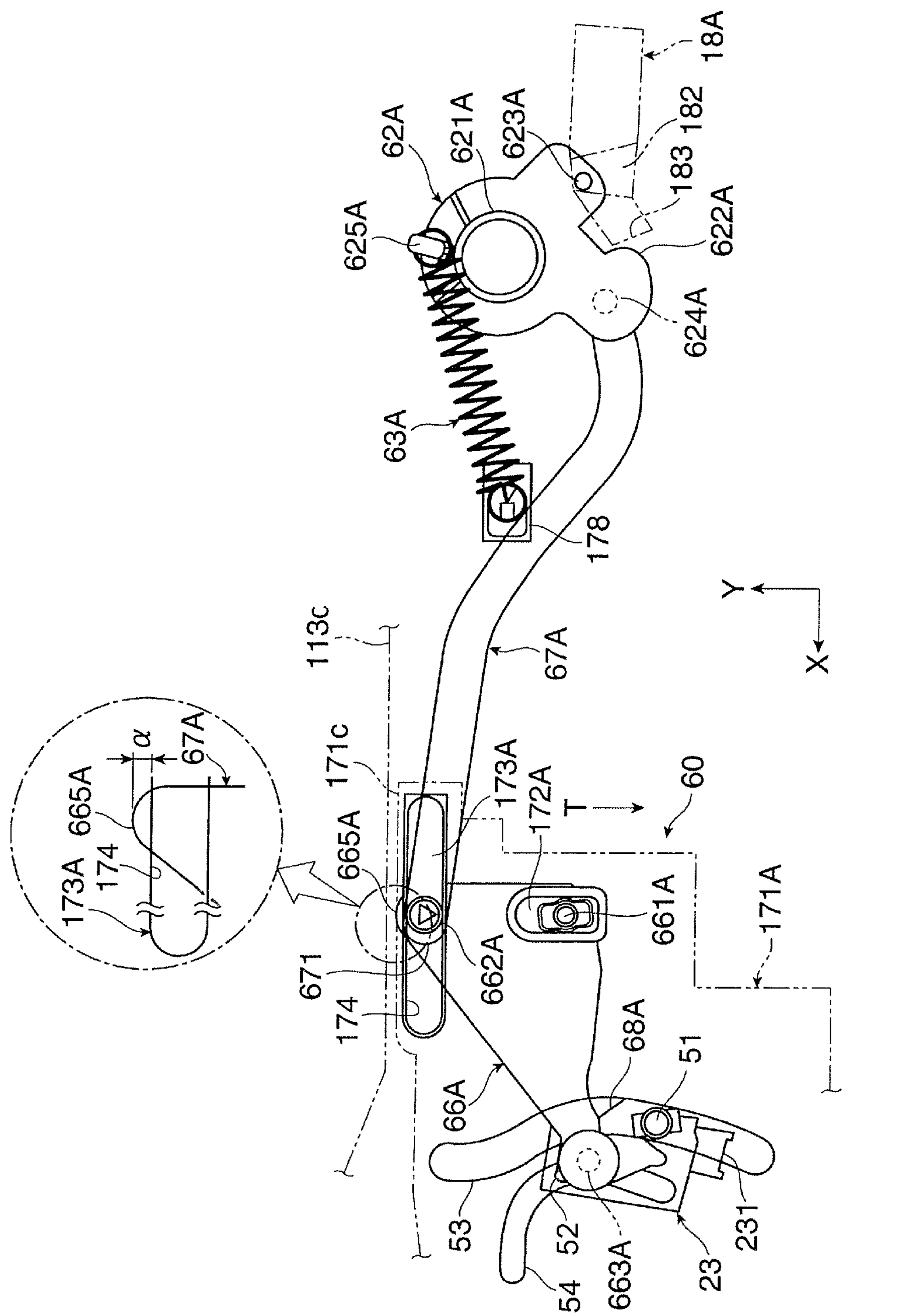
FIG. 18 is a schematic diagram illustrating yet another state of the link mechanism and other relevant elements included in the left part of the moving device (when the exposure device is at a position between the exposure position and the retracted position).

In the first exemplary embodiment, referring to FIGS. 12A, 18, and others, each of the guiding grooves 173A and 173B guides the first connecting pin 662A or 662B that moves between two positions (P10 and P20) corresponding to the exposure position P1 and the retracted position P2, respectively, of the exposure device 23 that is moved by the moving mechanisms 5A and 5B.

Referring to FIG. 12A, the long-side guiding portion 174 extends linearly or substantially linearly along a virtual straight line (N1) connecting the two positions P10 and P20 between which the first connecting pin 662A or 662B is guided within the guiding groove 173A or 173B. The long-side guiding portion 174 is provided on a farther one, from the supporting groove 172A or 172B, of two long sides of the oblong guiding groove 173A or 173B.

Referring to FIG. 12A, the supporting grooves 172A and 172B are each an oblong or substantially oblong groove extending along a virtual vertical line passing through a center CP, in the long-side direction (N1), of the guiding groove 173A or 173B.

Figure 11A:
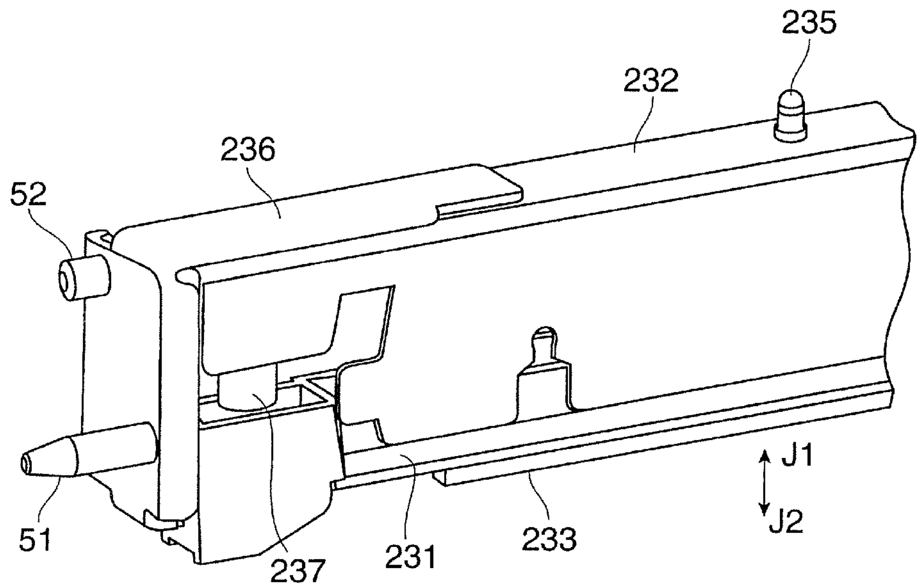
FIG. 11A is a schematic perspective view of one end of the exposure device illustrated in FIG. 10.
Figure 11B:
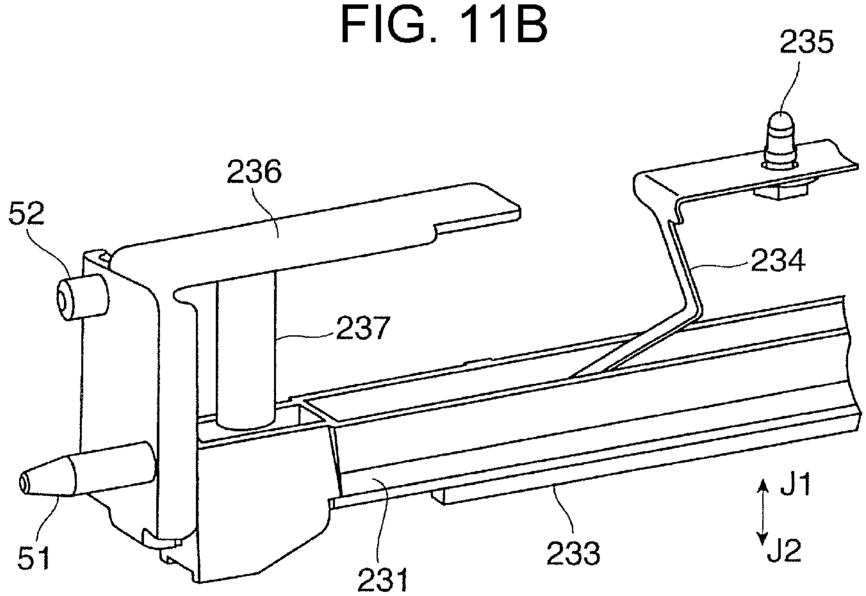
FIG. 11B is a schematic perspective view of an internal structure at the one end of the exposure device illustrated in FIG. 11A.

Referring to FIGS. 7, 11A, and 11B, the exposure device 23 attached to the moving mechanisms 5A and 5B includes an exposure body portion 231 and a supporting member 232 that supports the exposure body portion 231. The supporting member 232 has a substantially rectangular-U cross-sectional shape. The exposure body portion 231 is supported such that the two ends thereof are movable in directions represented by arrows J1 and J2 relative to respective attaching members 236. The exposure body portion 231 is provided with a light emitting portion 233 on a side thereof opposite a side thereof facing the supporting member 232. At the time of exposure, the light emitting portion 233 emits light.

Figure 10:
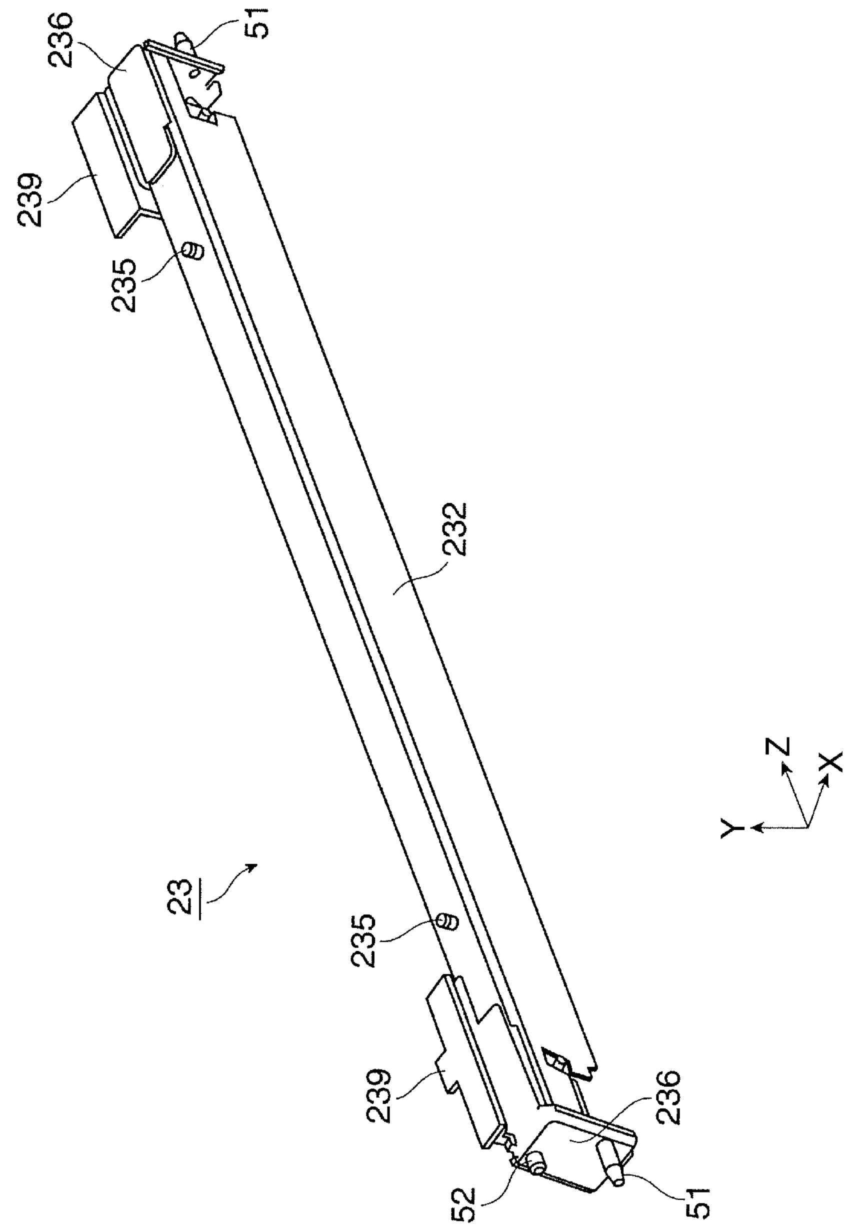
FIG. 10 is a schematic perspective view of an exposure device to be attached to the moving mechanism.

Referring to FIG. 10 and others, the attaching members 236 of the exposure device 23 are provided with the respective first projections 51 and the respective second projections 52 and are fixed to the two respective long-side ends of the supporting member 232.

Referring to FIGS. 10, 11A, 11B, and others, leaf springs 234 each attached at one end thereof to the exposure body portion 231 are each fixed at the other end thereof to the supporting member 232 with a corresponding one of fixing screws 235. Referring to FIGS. 11A and 11B, compression springs (coil springs) 237 are interposed between the exposure body portion 231 and the lower surfaces of the respective attaching members 236. Referring to FIG. 10 and others, protective coverings 239 cover and protect portions of the respective leaf springs 234 that are exposed from the respective long-side ends of the supporting member 232.

Referring to FIGS. 6, 12A, 12B, 13A to 14B, and others, the first guiding groove 53 and the second guiding groove 54 included in each of the moving mechanisms 5A and 5B and provided in each of the first supporting members 171A and 171B included in the moving devices 17A and 17B are close to each other in an area M1 nearer to the exposure position P1 as the first position but are gradually spaced apart from each other in an area M2 nearer to the retracted position P2 as the second position.

As illustrated in FIGS. 6, 12A, 12B, and others, the second guiding groove 54 is a single arc-shaped or substantially arc-shaped guiding groove. In addition, the first guiding groove 53 includes an arc-shaped or substantially arc-shaped portion 53*c* that curves along an arc-shaped or substantially arc-shaped portion of the second guiding groove 54 that is nearer to the exposure position P1, and an arc-shaped or substantially arc-shaped portion 53*d* that curves away from an arc-shaped or substantially arc-shaped portion of the second guiding groove 54 that is nearer to the retracted position P2.

Referring to FIGS. 5, 13A to 14B, 15, and others, the moving devices 17A and 17B (excluding the exposure device 23) including the respective moving mechanisms 5A and 5B and the respective link mechanisms 6A and 6B are attached to the outer surfaces of the respective left and right side faces 113 and 114 of the housing 10 at respective positions near the upper ends of the side faces 113 and 114 and near the respective side faces of the openable/closable covering 15.

Specifically, the moving mechanisms 5A and 5B are positioned in respective areas of the outer surfaces of the side faces 113 and 114 that overlap both the exposure position P1 and the retracted position P2 of the exposure device 23 that are defined in the imaging device 2 (the detachable unit 20).

Furthermore, the power input portions 61A and 61B (the rotatable members 62A and 62B, actually) included in the respective link mechanisms 6A and 6B are positioned in respective areas of the outer surfaces of the side faces 113 and 114 near the respective passage openings 117 provided in the respective side folded portions 113*b* and 114*b*.

Furthermore, the power transmitting portions 65A and 65B (the joining links 67A and 67B and the rotatable links 66A and 66B, actually) included in the respective link mechanisms 6A and 6B are positioned in respective areas of the outer surfaces of the side faces 113 and 114 between the respective moving mechanisms 5A and 5B and the respective power input portions 61A and 61B and near the respective upper folded portions 113*c* and 114*c*.

Behavior of Moving Mechanism, Link Mechanism, and Relevant Elements in Moving Exposure Device As described above, the moving mechanisms 5A and 5B behave in such a manner as to move the exposure device 23 between the exposure position P1 and the retracted position P2 by moving the link mechanisms 6A and 6B in conjunction with the opening and closing of the openable/closable covering 15.

Behavior in Opening Openable/Closable Covering

A behavior that is made when the openable/closable covering 15 in the closed state is opened will first be described. The openable/closable covering 15 is opened when the developer container 28 or the detachable unit 20 is to be detached for replacement or the like.

In the state where the openable/closable covering 15 is closed as illustrated in FIGS. 2, 13A, 14A, and others, the moving mechanisms 5A and 5B are retained in a state where the moving of the exposure device 23 to the exposure position P1 has been completed.

When the openable/closable covering 15 in the above state starts to be opened by being swung in the direction of the arrow B1, referring to FIGS. 13B and 14B, the drawing inclined surfaces 184 of the respective contact acting members 18A and 18B provided on the openable/closable covering 15 come into contact with the respective acting projections 623A and 623B of the rotatable members 62A and 62B included in the power input portions 61A and 61B of the link mechanisms 6A and 6B. Hence, the rotatable members 62A and 62B start to rotate in a direction represented by a dotted-line arrow C1.

The power generated by the above rotational motions of the rotatable members 62A and 62B in the direction of the dotted-line arrow C1 is transmitted through the power transmitting portions 65A and 65B of the link mechanisms 6A and 6B to the moving mechanisms 5A and 5B.

In other words, since the rotatable members 62A and 62B rotate in the direction of the dotted-line arrow C1, the joining links 67A and 67B of the power transmitting portions 65A and 65B are moved away from the moving mechanisms 5A and 5B in a direction represented by a dotted-line arrow D1. With such motions of the joining links 67A and 67B, the first connecting pins 662A and 662B of the rotatable links 66A and 66B are moved in a direction represented by a dotted-line arrow E1 along the guiding grooves 173A and 173B.

The action in which the contact acting members 18A and 18B provided on the openable/closable covering 15 that is swung in the direction of the arrow B1 come into contact with the rotatable members 62A and 62B and cause the rotatable members 62A and 62B to rotate in the direction of the dotted-line arrow C1 vanishes before the first connecting pins 662A and 662B moving in the direction of the dotted-line arrow E1 reach respective ends of the guiding grooves 173A and 173B, that is, when the contact acting members 18A and 18B on the openable/closable covering 15 that is being opened become out of contact with the respective rotatable members 62A and 62B. Nevertheless, as illustrated in FIGS. 13B and 14B, since tensions TA1 and TB1 generated by the respective tension springs 63A and 63B continue to act on the rotatable members 62A and 62B, the rotatable members 62A and 62B continue to rotate in the direction of the dotted-line arrow C1.

Since the first connecting pins 662A and 662B are moved in the direction of the dotted-line arrow E1, the rotatable links 66A and 66B rotate on the fulcrum pins 661A and 661B in a direction represented by a dotted-line arrow G1. With the rotation of the rotatable links 66A and 66B, the second connecting pins 663A and 663B move in the direction of the dotted-line arrow G1. In this step, the second connecting pins 663A and 663B move along substantially arc-shaped loci, respectively, from the lower side toward the upper side.

Subsequently, the power generated by the rotational motions of the second connecting pins 663A and 663B of the rotatable links 66A and 66B in the direction of the dotted-line arrow G1 is transmitted through the connecting links 68A and 68B to the first projections 51 provided on the exposure device 23.

Consequently, the first projections 51 move along the first guiding grooves 53 of the moving mechanisms 5A and 5B from the lower ends to the upper ends of the first guiding grooves 53. Along with such movements of the first projections 51, the second projections 52 also provided on the exposure device 23 move along the second guiding grooves 54 of the moving mechanisms 5A and 5B from the lower ends to the upper ends of the second guiding grooves 54.

To summarize, when the openable/closable covering 15 is opened, the moving mechanisms 5A and 5B behave in conjunction with the opening of the openable/closable covering 15 in such a manner as to move the exposure device 23 (from the exposure position P1) to the retracted position P2 as illustrated in FIGS. 4, 6, 13B, 14B, and others.

The exposure device 23 thus moved to the retracted position P2 by the moving mechanisms 5A and 5B is kept stationary in an orientation in which (the light emitting portion 233 of) the exposure body portion 231 faces obliquely upward (for example, upward in the long-side direction of the second attaching/detaching space S2) as illustrated in FIGS. 4, 6, and others.

The exposure device 23 is stopped and retained at the retracted position P2 by the following mechanism.

In the above state, the contact acting members 18A and 18B provided on the openable/closable covering 15 are totally spaced apart from the rotatable members 62A and 62B. However, as illustrated in FIGS. 13B and 14B, the tensions TA1 and TB1 generated by the tension springs 63A and 63B and acting to rotate the rotatable members 62A and 62B of the link mechanisms 6A and 6B in the direction of the dotted-line arrow C1 continue to be applied to the rotatable members 62A and 62B. Therefore, the power acting to rotate the rotatable members 62A and 62B in the direction of the dotted-line arrow C1 is transmitted through the power transmitting portions 65A and 65B and continues to be applied to the rotatable links 66A and 66B as forces FA1 and FB1 acting to rotate the rotatable links 66A and 66B in the direction of the dotted-line arrow G1.

Since the power acting to rotate the rotatable links 66A and 66B in the direction of the dotted-line arrow G1 continues to be applied, the first projections 51 and the second projections 52 provided on the exposure device 23 are retained at the upper ends of the first guiding grooves 53 and the second guiding grooves 54.

Thus, the exposure device 23 moved to the retracted position P2 by the moving mechanisms 5A and 5B is present on the outside of the second attaching/detaching space S2 as illustrated in FIG. 4.

Hence, in the image forming apparatus 1, the detachable unit 20 is attachable to or detachable from the housing 10 through the second attaching/detaching space S2 without being hindered by the presence of the exposure device 23. When the exposure device 23 is stationary at the retracted position P2, (the light emitting portion 233 of) the exposure body portion 231 does not face toward the second attaching/detaching space S2. Hence, there is no chance that the exposure body portion 231 may accidentally interfere with and be damaged by the detachable unit 20 passing through the second attaching/detaching space S2.

In the image forming apparatus 1, when the exposure device 23 is stationary at the retracted position P2, (the light emitting portion 233 of) the exposure body portion 231 faces toward an open part at the top of the housing 10 that is provided when the openable/closable covering 15 is opened. Therefore, as long as no other components (i.e, obstacles) are present in an area between the exposure device 23 at the retracted position P2 and the open part at the top of the housing 10, (the light emitting portion 233 of) the exposure body portion 231 of the exposure device 23 is allowed to be cleaned while being observed visually.

With the first guiding grooves 53 and the second guiding grooves 54 of the moving mechanisms 5A and 5B included in the image forming apparatus 1 that are designed as illustrated in FIG. 6 and others, the exposure device 23 moved to the retracted position P2 takes a stationary orientation that is at 90° or approximately 90° or greater with respect to the stationary orientation for the exposure position P1. The expression "orientation at 90° or approximately 90° or greater" refers to an orientation of the exposure device 23 established when the exposure device 23 is rotated such that an angle of intersection θ of virtual straight lines K1 and K2 illustrated by two-dot chain lines, respectively, in FIG. 6 becomes 90° or approximately 90° or greater.

With the above moving mechanisms 5A and 5B, the stationary orientation of the exposure device 23 at the exposure position P1 and the stationary orientation of the exposure device 23 at the retracted position P2 are made different from each other in such a manner as to be at 90° or approximately 90° or greater with respect to each other.

Behavior in Closing Openable/Closable Covering

A behavior that is made when the openable/closable covering 15 in the opened state is closed will now be described.

In the state where the openable/closable covering 15 is opened as illustrated in FIGS. 4, 13B, 14B, and others, the moving mechanisms 5A and 5B are retained in a state where the moving of the exposure device 23 to the retracted position P2 has been completed.

When the openable/closable covering 15 in the above state starts to be closed by being swung in the direction of the arrow B2, referring to FIGS. 13B and 14B, the contact surface portions 183 of the respective contact acting members 18A and 18B provided on the openable/closable covering 15 come into contact with the respective contact receiving portions 622A and 622B of the rotatable members 62A and 62B included in the power input portions 61A and 61B of the link mechanisms 6A and 6B. Hence, the rotatable members 62A and 62B start to rotate in a direction represented by a dotted-line arrow C2.

The power generated by the above rotational motions of the rotatable members 62A and 62B in the direction of the dotted-line arrow C2 is transmitted through the power transmitting portions 65A and 65B of the link mechanisms 6A and 6B to the moving mechanisms 5A and 5B.

In other words, since the rotatable members 62A and 62B rotate in the direction of the dotted-line arrow C2, the joining links 67A and 67B of the power transmitting portions 65A and 65B are moved toward the moving mechanisms 5A and 5B in a direction represented by a dotted-line arrow D2. With such motions of the joining links 67A and 67B, the first connecting pins 662A and 662B of the rotatable links 66A and 66B are moved in a direction represented by a dotted-line arrow E2 along the guiding grooves 173A and 173B.

The action in which the contact acting members 18A and 18B provided on the openable/closable covering 15 that is swung in the direction of the arrow B2 come into contact with the rotatable members 62A and 62B and cause the rotatable members 62A and 62B to rotate in the direction of the dotted-line arrow C2 is achieved in the following two steps: a first step in which the contact surface portions 183 of the contact acting members 18A and 18B are brought into contact with the contact receiving portions 622A and 622B of the rotatable members 62A and 62B, and a second step in which the acting projections 623A and 623B of the rotatable members 62A and 62B are brought into contact with the pressing inclined surfaces 185 of the contact acting members 18A and 18B.

Thus, the angle of rotation of the rotatable members 62A and 62B in the direction of the dotted-line arrow C2 is made greater than in a case where only the contact surface portions 183 are brought into contact with the contact receiving portions 622A and 622B of the rotatable members 62A and 62B (a case where only the first step is performed). Such a configuration also increases the length of movement of the exposure device 23 by the moving mechanisms 5A and 5B.

In the above step, since the first connecting pins 662A and 662B are moved in the direction of the dotted-line arrow E2, the rotatable links 66A and 66B rotate on the fulcrum pins 661A and 661B and in a direction represented by a dotted-line arrow G2. With the rotation of the rotatable links 66A and 66B, the second connecting pins 663A and 663B move in the direction of the dotted-line arrow G2. In this step, the second connecting pins 663A and 663B move along substantially arc-shaped loci, respectively, from the upper side toward the lower side.

Subsequently, the power generated by the rotational motion of the second connecting pins 663A and 663B of the rotatable links 66A and 66B in the direction of the dotted-line arrow G2 is transmitted through the connecting links 68A and 68B to the first projections 51 provided on the exposure device 23.

Consequently, the first projections 51 move along the first guiding grooves 53 of the moving mechanisms 5A and 5B from the upper ends to the lower ends of the first guiding grooves 53. Along with such movements of the first projections 51, the second projections 52 also provided on the exposure device 23 move along the second guiding grooves 54 of the moving mechanisms 5A and 5B from the upper ends to the lower ends of the second guiding grooves 54.

To summarize, when the openable/closable covering 15 is closed, the moving mechanisms 5A and 5B behave in conjunction with the closing of the openable/closable covering 15 in such a manner as to move the exposure device 23 (from the retracted position P2) to the exposure position P1 as illustrated in FIGS. 2, 6, 13A, 14A, and others.

The exposure device 23 thus moved to the exposure position P1 by the moving mechanisms 5A and 5B is kept stationary in an orientation in which (the light emitting portion 233 of) the exposure body portion 231 faces obliquely downward (toward the position of the photoconductor drum 21 to which the light is to be applied, i.e., the position where the electrostatic latent image is to be formed) as illustrated in FIGS. 2, 6, and others.

The exposure device 23 is stopped and retained at the exposure position P1 by the following mechanism.

In the above state, referring to FIGS. 13A and 14A, tensions TA2 and TB2 generated by the tension springs 63A and 63B and acting to rotate the rotatable members 62A and 62B of the link mechanisms 6A and 6B in the direction of the dotted-line arrow C2 continue to be applied to the rotatable members 62A and 62B. In this state, the tension springs 63A and 63B are extended longer than in the state where the exposure device 23 is at the retracted position P2. Accordingly, the tensions TA2 and TB2 are greater than the tensions TA1 and TB1 generated when the exposure device 23 is at the retracted position P2. Therefore, the power acting to rotate the rotatable members 62A and 62B in the direction of the dotted-line arrow C2 is transmitted through the power transmitting portions 65A and 65B and continues to be applied to the rotatable links 66A and 66B as forces FA2 and FB2 acting to rotate the rotatable links 66A and 66B in the direction of the dotted-line arrow G2. Thus, the rotatable links 66A and 66B continue to be pressed in the direction of the dotted-line arrow G2.

The contact acting members 18A and 18B provided on the openable/closable covering 15 in the closed state are kept out of contact with the acting projections 623A and 623B of the rotatable members 62A and 62B, with the acting projections 623A and 623B each being present in substantially the center of the depressed portion 182 (see FIG. 9) of a corresponding one of the contact acting members 18A and 18B.

Meanwhile, the exposure body portion 231 of the exposure device 23 that is at the exposure position P1 is pressed against a positioning/stopping portion (not illustrated) of the detachable unit 20 and thus receives reaction forces generated by the compression springs 237 (see FIG. 11B). With the reaction forces, the position of the exposure device 23 is retained while being pressed back in the direction of the arrow J1 with the aid of the supporting member 232, the attaching members 236, the first projections 51, and the second projections 52.

The rotatable links 66A and 66B of the link mechanisms 6A and 6B are configured such that when the exposure device 23 is moved to the exposure position P1, the second connecting pins 663A and 663B move to and stop at respective positions beyond the dead points thereof in the direction of the dotted-line arrow G2. The term "dead points" used herein describes a state where the second connecting pins 663A and 663B are each present on a virtual straight line connecting a corresponding one of the fulcrum pins 661A and 661B and a corresponding one of the first projections 51. That is, in the above state, the rotatable links 66A and 66B are each oriented such that a virtual line connecting a corresponding one of the fulcrum pins 661A and 661B, a corresponding one of the second connecting pins 663A and 663B, and a corresponding one of the first projections 51 is generally bent, with the position of the second connecting pin 663A or 663B projecting in the direction of the dotted-line arrow G2.

Hence, the rotatable links 66A and 66B receive not only the forces FA2 and FB2 but also the reaction forces acting in the direction of the arrow J1 from the exposure device 23. Therefore, the rotatable links 66A and 66B continue to be pressed in the direction of the dotted-line arrow G2, without rotating in the direction of the dotted-line arrow G1, such that the above connecting line is kept bent. Consequently, the first projections 51 and the second projections 52 provided on the exposure device 23 are retained at the lower ends of the first guiding grooves 53 and the second guiding grooves 54.

Thus, the exposure device 23 moved to the exposure position P1 by the moving mechanisms 5A and 5B becomes ready to perform exposure, as illustrated in FIG. 2, for forming an electrostatic latent image.

Detailed Configuration of Above Features of Link Mechanism and Effects Brought Thereby In the link mechanism portions 60 included in the respective link mechanisms 6A and 6B, the guiding grooves 173A and 173B include the respective long-side guiding portions 174 provided as described above, and the supporting grooves 172A and 172B are provided in the form of oblong or substantially oblong grooves as described above (see FIGS. 12A and 12B).

Figure 16:
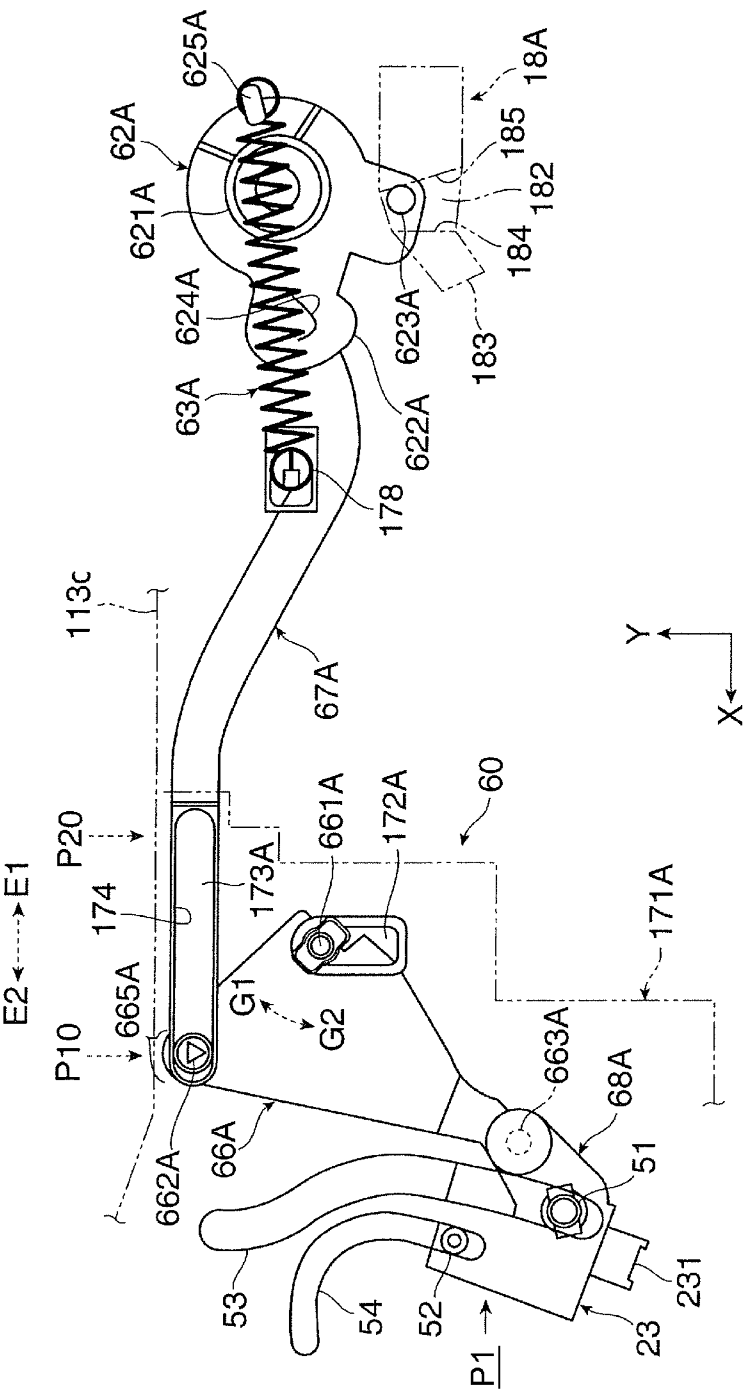
FIG. 16 is a schematic diagram illustrating a state of the link mechanism and other relevant elements included in the left part of the moving device (when the exposure device is at the exposure position)
Figure 17:
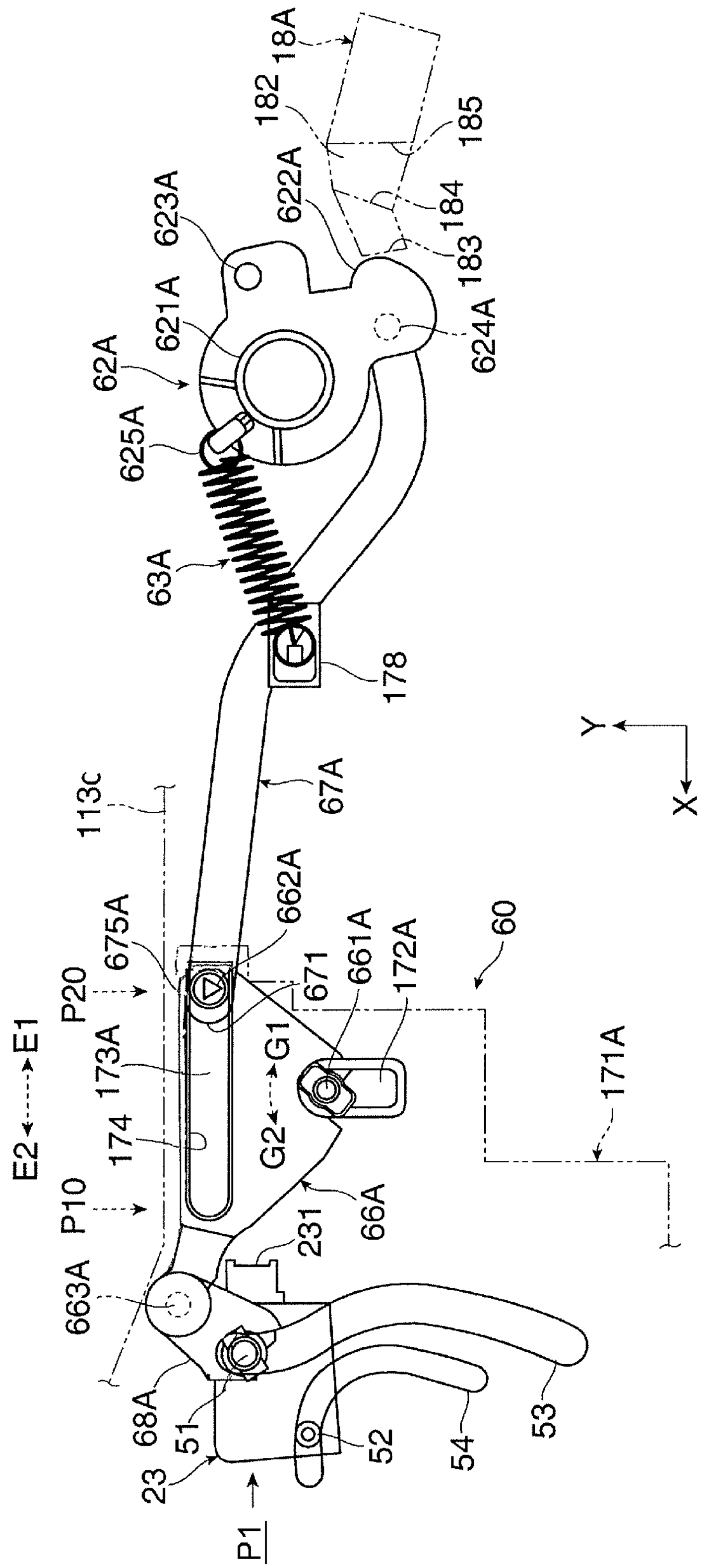
FIG. 17 is a schematic diagram illustrating another state of the link mechanism and other relevant elements included in the left part of the moving device (when the exposure device is at the retracted position)

Hence, when the rotatable links 66A and 66B rotate on the respective fulcrum pins 661A and 661B, referring to FIGS. 16 to 18, the fulcrum pins 661A and 661B are temporarily displaced (moved) within the respective supporting grooves 172A and 172B in a direction T away from the respective guiding grooves 173A and 173B. Simultaneously, the first connecting pins 662A and 662B each move between the two positions (P10 and P20) while being guided linearly or substantially linearly by the long-side guiding portion 174 of a corresponding one of the guiding grooves 173A and 173B (see FIG. 18).

The above behavior reduces a length of projection α (see FIG. 18) by which portions 665A and 665B of the respective rotatable links 66A and 66B where the first connecting pins 662A and 662B are provided each project from a side (the long-side guiding portion 174 in the first exemplary embodiment), farther from the supporting groove 172A or 172B, of the guiding groove 173A or 173B that guides the first connecting pin 662A or 662B between the two positions P10 and P20 with the rotation of the rotatable link 66A or 66B.

Hence, in the image forming apparatus 1, it is easy to provide the link mechanism portions 60 near the respective upper folded portions 113*c* and 114*c* (see FIGS. 13A to 18) that are exemplary inner wall surfaces of the respective side faces 113 and 114 of the housing 10.

In contrast, for example, if the supporting grooves 172A and 172B that support the fulcrum pins 661A and 661B of the rotatable links 66A and 66B are grooves (for example, simple circular grooves) that allow the rotatable links 66A and 66B to only rotate, the link mechanisms 6A and 6B behave as follows.

When the rotatable links 66A and 66B rotate on the fulcrum pins 661A and 661B, the portions 665A and 665B of the rotatable links 66A and 66B each move along an arc-shaped or substantially arc-shaped locus defined by a radius corresponding to the distance R from a corresponding one of the fulcrum pins 661A and 661B to a corresponding one of the first connecting pins 662A and 662B of the rotatable links 66A and 66B, without the rotatable links 66A and 66B being temporarily displaced within the supporting grooves 172A and 172B.

Therefore, the portions 665A and 665B of the rotatable links 66A and 66B each also move along the same arc-shaped or substantially arc-shaped locus. Accordingly, the length of projection α of each of the portions 665A and 665B from the side of the guiding groove 173A or 173B that is farther from the supporting groove 172A or 172B is not reduced.

In the first exemplary embodiment, however, the long-side guiding portion 174 extends linearly or substantially linearly along the virtual straight light (N1) connecting the two positions P10 and P20, as described above. Therefore, the length of projection α is assuredly reduced.

Furthermore, in the first exemplary embodiment, the supporting grooves 172A and 172B are each an oblong or substantially oblong groove extending along the virtual vertical line (N2) passing through the center CP, in the long-side direction (N1), of a corresponding one of the guiding grooves 173A and 173B, as described above. Therefore, the rotatable links 66A and 66B are allowed to rotate smoothly while the length of projection α is reduced.

Referring to FIGS. 12A, 12B, 18, and others, in each of the link mechanism portions 60, the guiding groove 173A or 173B is provided in an end portion 171*c* of the first supporting member 171A or 171B such that the long-side direction (N1) of the guiding groove 173A or 173B corresponds to a direction in which the edge of the end portion 171*c* extends.

Therefore, in the link mechanism portions 60, a length of projection (β, not illustrated) by which the portions 665A and 665B of the rotatable links 66A and 66B where the first connecting pins 662A and 662B are provided each project from the end portion 171*c* of a corresponding one of the first supporting members 171A and 171B is reduced. This effect is more assuredly produced if the edges of the end portions 171*c* of the respective first supporting members 171A and 171B are made linear or substantially linear and substantially parallel to the long-side direction (N1) of the guiding grooves 173A and 173B.

Referring to FIGS. 12B, 16, and others, in the link mechanism portions 60, during a period in which the rotatable links 66A and 66B rotate and the first connecting pins 662A and 662B move along the guiding grooves 173A and 173B, the length of projection α by which the portions 665A and 665B of the rotatable links 66A and 66B where the first connecting pins 662A and 662B are provided each project from one of the two long sides of a corresponding one of the guiding grooves 173A and 173B is constant, the one long side being the side farther from a corresponding one of the supporting grooves 172A and 172B.

Therefore, in the link mechanism portions 60, the length of projection (β) by which the portions 665A and 665B of the rotatable links 66A and 66B each project from a region on a side, farther from the supporting groove 172A or 172B, of the guiding groove 173A or 173B is reduced. If the portions 665A and 665B of the rotatable links 66A and 66B are each shaped to have, for example, an arc or substantially arc shape, the length of projection (β) is reduced more easily.

In the link mechanism portions 60, the joining links 67A and 67B as exemplary driving links are connected to the first connecting pins 662A and 662B of the rotatable links 66A and 66B. The joining links 67A and 67B transmit the power that moves the first connecting pins 662A and 662B within the guiding grooves 173A and 173B to the first connecting pins 662A and 662B.

Therefore, in the link mechanism portions 60, referring to FIG. 18 and others, it is easy to adjust and reduce the length (a length resembling the length of projection α) by which ends 671 of the respective joining links 67A and 67B that are connected to the respective first connecting pins 662A and 662B of the rotatable links 66A and 66B each project from a region on the side, farther from the supporting groove 172A or 172B, of the guiding groove 173A or 173B.

In the link mechanism portions 60, referring to FIG. 17 and others, the ends 671 of the joining links 67A and 67B that are connected to the first connecting pins 662A and 662B each have an arc or substantially arc shape such that the length by which the end 671 projects from one of the two long sides of the guiding groove 173A or 173B that is farther from the supporting groove 172A or 172B is constant during a period in which the rotatable links 66A and 66B rotate and the first connecting pins 662A and 662B move within the guiding grooves 173A and 173B.

Therefore, in the link mechanism portions 60, the length (a length resembling the length of projection α) by which the ends 671 of the joining links 67A and 67B each project from the region on the side of the guiding groove 173A or 173B that is farther from the supporting groove 172A or 172B is assuredly reduced.

Other Exemplary Embodiments

While the first exemplary embodiment concerns a case where the long-side guiding portion 174 included in each of the link mechanism portions 60 is provided on one of the two long sides of the guiding groove 173A or 173B, the long-side guiding portion 174 may be provided on each of the two long sides the guiding groove 173A or 173B.

While the first exemplary embodiment concerns a case where the rotatable links 66A and 66B included in the link mechanism portions 60 each generally have a triangular shape, the rotatable links 66A and 66B may each have another shape.

While the first exemplary embodiment concerns a case where the rotatable links 66A and 66B are each provided with two connecting pins, the rotatable links 66A and 66B may each be provided with one or three or more connecting pins.

While the first exemplary embodiment concerns a case where the guiding grooves 173A and 173B and the supporting grooves 172A and 172B are provided in the first supporting members 171A and 171B included in the moving devices 17A and 17B, the present invention is not limited to such a case. For example, the guiding grooves 173A and 173B and the supporting grooves 172A and 172B may alternatively be provided directly in the side faces 113 and 114 of the housing 10.

In addition, the guiding grooves 173A and 173B and the supporting grooves 172A and 172B may each be provided in the form of a through hole (an oblong or substantially oblong hole).

While the first exemplary embodiment concerns a case where the link mechanisms 6A and 6B including the link mechanism portions 60 are used with the moving mechanisms 5A and 5B that move the exposure device 23, the link mechanisms 6A and 6B including the link mechanism portions 60 may alternatively be applied to another component or apparatus (a technical field other than the field of image forming apparatuses).

While the first exemplary embodiment concerns a case where the link mechanisms 6A and 6B including the link mechanism portions 60 are included in the image forming apparatus 1 employing an electrophotographic image forming method. Alternatively, the link mechanisms 6A and 6B including the link mechanism portions 60 may be included in an image forming apparatus employing another image forming method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A link mechanism comprising:

a rotatable link having a fulcrum pin on which the rotatable link rotates, and a connecting pin provided at a different position from the fulcrum pin; and a supporting member having a guiding groove along which the connecting pin of the rotatable link that is moved between two positions is guided, and a supporting groove in which the fulcrum pin of the rotatable link is rotatably supported, wherein the guiding groove of the supporting member includes a long-side guiding portion shaped with a curvature that is greater than a curvature of a substantially arc shape defined by a radius corresponding to a distance between the fulcrum pin and the connecting pin of the rotatable link, and wherein the supporting groove of the supporting member is a substantially oblong groove extending in a direction intersecting a direction in which the long-side guiding portion of the guiding groove extends.

2. The link mechanism according to claim 1, wherein the long-side guiding portion extends substantially linearly along a virtual straight line connecting the two positions.

3. The link mechanism according to claim 1, wherein the long-side guiding portion is provided at least on a farther one, from the supporting groove, of long sides of the guiding groove.

4. The link mechanism according to claim 1, wherein the supporting groove is a substantially oblong groove extending along a virtual vertical line passing through a long-side center of the guiding groove.

5. The link mechanism according to claim 1, wherein the guiding groove is provided in an end portion of the supporting member such that a long-side direction of the guiding groove corresponds to a direction in which an edge of the end portion extends.

6. The link mechanism according to claim 5, wherein the edge of the end portion of the supporting member in which the guiding groove is provided is substantially linear and substantially parallel to the long-side direction of the guiding groove.

7. The link mechanism according to claim 1, wherein an end portion of the rotatable link where the connecting pin is provided is shaped such that a length by which the end portion projects from a farther one, from the supporting groove, of long sides of the guiding groove is constant during a period in which the connecting pin moves within the guiding groove and the rotatable link rotates.

8. The link mechanism according to claim 7, wherein the end portion of the rotatable link where the connecting pin is provided includes a substantially arc-shaped part.

9. The link mechanism according to claim 1, wherein the connecting pin of the rotatable link is connected to a driving link that transmits power that moves the connecting pin within the guiding groove.

10. The link mechanism according to claim 9, wherein an end of the driving link that is connected to the connecting pin is shaped such that a length by which the end projects from a farther one, from the supporting groove, of long sides of the guiding groove is constant during a period in which the rotatable link rotates and the connecting pin moves within the guiding groove.

11. An image forming apparatus comprising:

a housing that houses an imaging device and has an inner wall surface; and a link mechanism provided near the inner wall surface of the housing, wherein the link mechanism is the link mechanism according to claim 1, and wherein the supporting member of the link mechanism is attached to the housing such that a long side of the guiding groove is in most proximity to and substantially parallel to the inner wall surface of the housing.

12. The image forming apparatus according to claim 11, wherein the inner wall surface of the housing to which the link mechanism is provided in proximity is on an inner side of a top face of the housing.

13. An image forming apparatus comprising:

a housing that houses imaging means and has an inner wall surface; and link means provided near the inner wall surface of the housing, wherein the link means is the link mechanism according to claim 1, and wherein the supporting member of the link means is attached to the housing such that a long side of the guiding groove is in most proximity to and substantially parallel to the inner wall surface of the housing.

* * * * *